United States Patent
Utsugi et al.

(10) Patent No.: US 9,881,417 B2
(45) Date of Patent: Jan. 30, 2018

(54) MULTI-VIEW DRAWING APPARATUS OF THREE-DIMENSIONAL OBJECTS, AND METHOD

(71) Applicant: CELSYS, INC., Tokyo (JP)

(72) Inventors: Kei Utsugi, Kokubunji (JP); Yosuke Kawakami, Tokyo (JP); Kentaro Yamaguchi, Tokyo (JP)

(73) Assignee: CELSYS, INC., Tokyo (JP)

( * ) Notice: Subject to any disclaimer, the term of this patent is extended or adjusted under 35 U.S.C. 154(b) by 0 days.

(21) Appl. No.: 14/815,004

(22) Filed: Jul. 31, 2015

(65) Prior Publication Data

US 2015/0339850 A1    Nov. 26, 2015

Related U.S. Application Data

(63) Continuation of application No. PCT/JP2014/051722, filed on Jan. 27, 2014.

(30) Foreign Application Priority Data

Feb. 1, 2013 (JP) ................................ 2013-018911
Feb. 1, 2013 (JP) ................................ 2013-018912

(51) Int. Cl.
*G06T 17/10* (2006.01)
*G06T 19/20* (2011.01)
(Continued)

(52) U.S. Cl.
CPC .............. *G06T 17/10* (2013.01); *G06T 13/40* (2013.01); *G06T 15/02* (2013.01); *G06T 15/20* (2013.01);
(Continued)

(58) Field of Classification Search
None
See application file for complete search history.

(56) References Cited

U.S. PATENT DOCUMENTS 6,437,779 B1     8/2002  Saito et al.
6,993,462 B1 *   1/2006  Pavlovi .............. G06K 9/00342
                                                                382/103
(Continued)

FOREIGN PATENT DOCUMENTS

JP        2005-141545      6/2005

OTHER PUBLICATIONS

Cgworld.Jp; New dynamics in Japanese animation CG:, Autodesk 3ds Max2011xPSOFT Pencil+3 (Fourth Part); http://cgworld.jp/feature/review/pencil+3-vol4.html: Dec. 24, 2012; 12 pages.
(Continued)

*Primary Examiner* — James A Thompson
(74) *Attorney, Agent, or Firm* — Ladas & Parry LLP

(57) ABSTRACT

A drawing apparatus is for drawing a three-dimensional model including a plurality of nodes present in a three-dimensional space, by using a plurality of viewpoints. The drawing apparatus includes a memory configured to store drawing information including a correspondence relationship between the plurality of nodes and the plurality of viewpoints, and drawing parameters relevant to the plurality of viewpoints; and a CPU configured to transform the three-dimensional model into an image, by a plurality of polygons constituting the three-dimensional model, by using the drawing information. The CPU changes the drawing information in response to a position or a state of a predetermined one or a plurality of the nodes satisfying a predetermined condition, and calculates drawing positions of vertices of the plurality of polygons, by using the viewpoints corresponding to the nodes to which the vertices belong, based on the changed drawing information.

17 Claims, 18 Drawing Sheets

(51) Int. Cl.
  *G06T 15/20* (2011.01)
  *G06T 13/40* (2011.01)
  *G06T 15/02* (2011.01)
(52) U.S. Cl.
  CPC ............ *G06T 15/205* (2013.01); *G06T 19/20* (2013.01); *G06T 2200/04* (2013.01)

(56) References Cited

U.S. PATENT DOCUMENTS

| | | | |
|---|---|---|---|
| 2006/0232584 A1 | 10/2006 | Utsugi et al. | |
| 2009/0284529 A1* | 11/2009 | De Aguiar | G06T 13/40 345/420 |
| 2014/0035901 A1* | 2/2014 | Chen | G06T 13/40 345/419 |
| 2015/0178988 A1* | 6/2015 | Montserrat Mora | G06T 13/40 345/420 |

OTHER PUBLICATIONS

Jingyi Yu; "Multiperspective Modeling, Rendering, and Imaging", SIGGRAPH ASIA 2008 Course Note, http://www.csbio.unc.edu/mcmillan/pubs/siga08-yu-pdf; Dec. 2008; 36 pages.

Kei Utsugi; "E-IMPACT—3DCG imitating exaggerted expressions in Japanese animations", Feature—Latest digital content production technology, Video information media society academic journal, Feb. 2012, 66(2), pp. 102-105.

Kei Utsugi, et al; "E-IMPACT: Exaggerated Illustrations using Multi-perspective Animation Control Tree Structure", ACE 2011—International Conference on Advances in Computer Entertainment Technology and DIMEA 2011—Digital Interactive Media Entertainment and Arts Conference (Nov. 8-Nov. 11, 2011); http://dl.acm.org/citation.cfm?id=2071502; 8 pages.

Eric Lengyel; "Projection Matrix Tricks", Terathon Software http://www.terathon.com/gdc07_lengyel.pdf; 22 pages; Mar. 2007.

Kei Utsugi, et al; "Nippon no Animation ni Okeru Kocho Hyogen o Moshita 3D CG "E-IMPACT" no Jisso", the Virtual Reality Society of Japan Kenkyu Hokoku, Cyberspace to Kaso Toshi Kenkyukai, Apr. 12, 2012, vol. 17, No. CS-1, CSVS2012-5, pp. 23 to 28.

International Search Report dated Feb. 18, 2014; PCT/JP2014/051722.

* cited by examiner

PARTIAL ELEMENT
○ JOINT
● JOINT n
◍ JOINT m

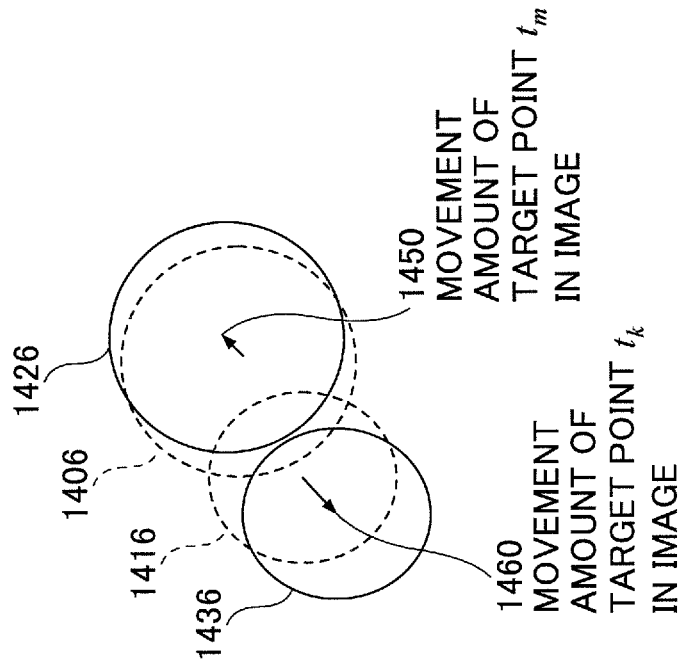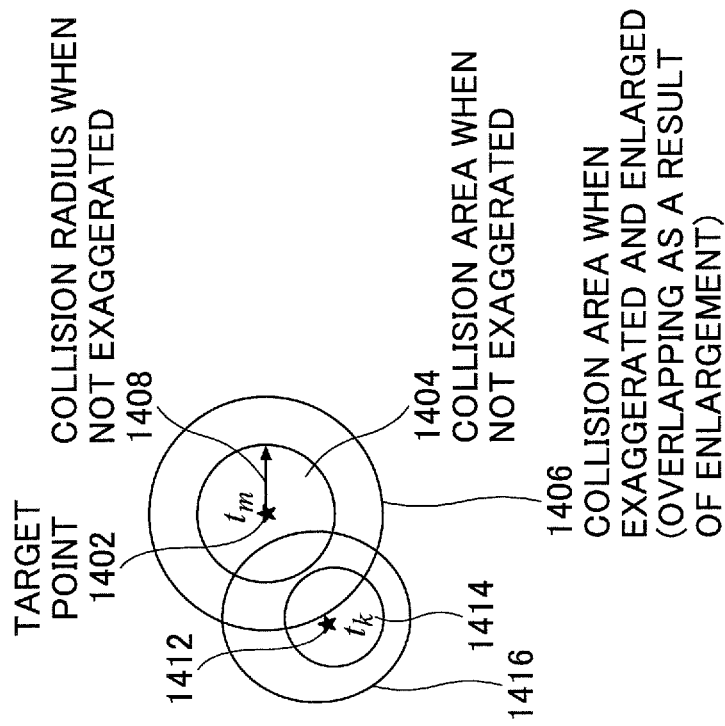
FIG.14A
FIG.14B

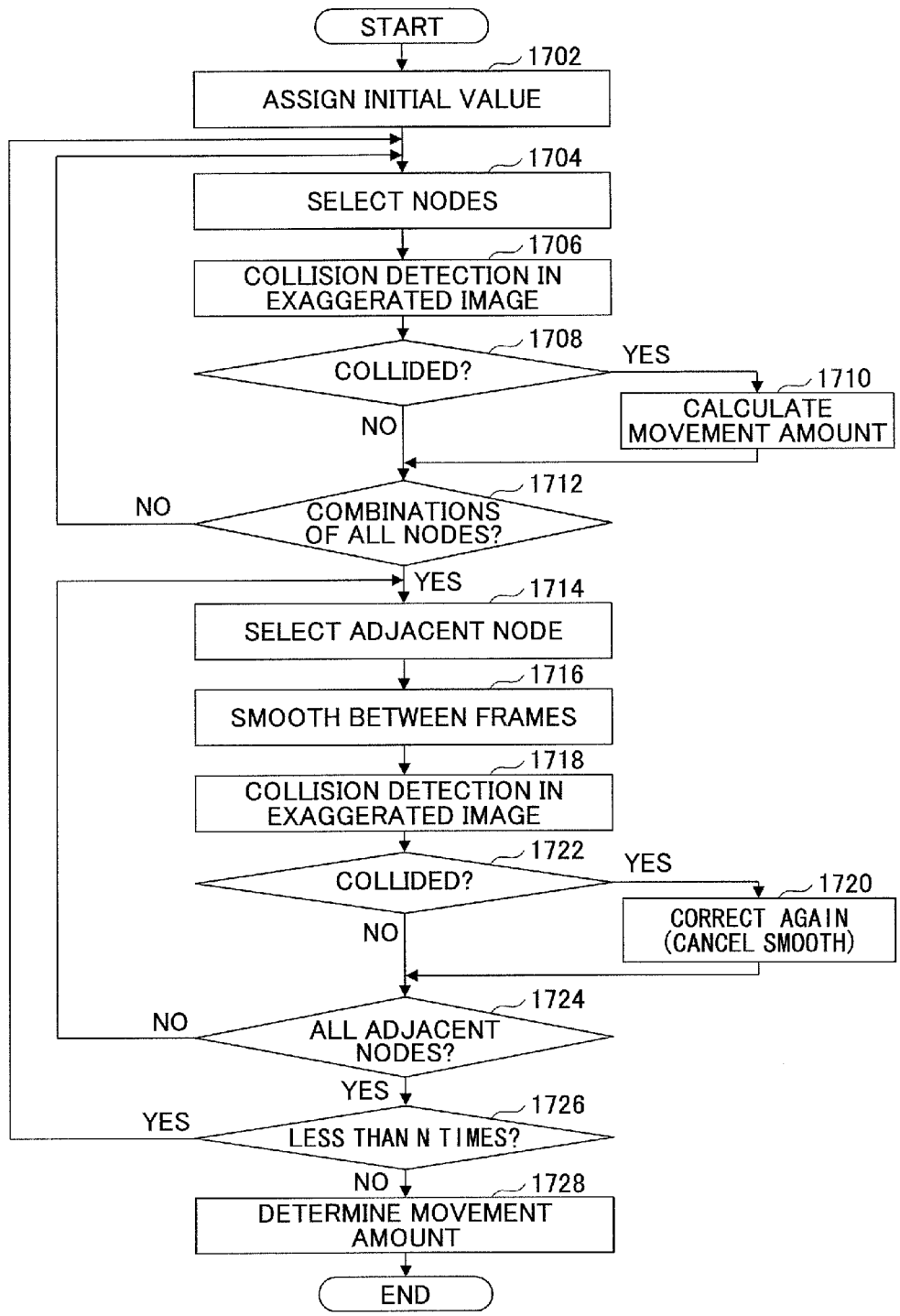

US 9,881,417 B2

MULTI-VIEW DRAWING APPARATUS OF THREE-DIMENSIONAL OBJECTS, AND METHOD

CROSS-REFERENCE TO RELATED APPLICATION

This application is a U.S. continuation application filed under 35 USC 111(a) claiming benefit under 35 USC 120 and 365(c) of PCT application JP2014/51722 filed in Japan on Jan. 27, 2014 which claims priority to Japanese Patent Application No. 2013-018911 filed in Japan on Feb. 1, 2013 and Japanese Patent Application No. 2013-018912 filed in Japan on Feb. 1, 2013. The foregoing application is hereby incorporated herein by reference.

BACKGROUND OF THE INVENTION

1. Field of the Invention

The embodiments discussed herein are related to a technology of drawing images by projecting three-dimensional objects from a plurality of viewpoints.

2. Description of the Related Art

In conventional handwritten animation and comic books, in order to give a strong realistic sensation or impact, in a perspective drawing method, expressions in which the difference in the visual size between a distant part and a close part is excessively exaggerated, are often used.

FIGS. 1A and 1B illustrate an example of comparing an exaggerated image with a regular image. Comparing FIG. 1A and FIG. 1B, in FIG. 1B, the foot 102 is drawn to appear larger than the foot 101 in FIG. 1A, and therefore the depth is clearly expressed and impressive. The image of FIG. 1A has been rendered by an accurate perspective projection method. Meanwhile, in the image of FIG. 1B, the depth expression is exaggerated by enlarging the difference in the visual size between the foot that is stuck out forward and the rest of the body. In the present specification, this kind of image is referred to as an "exaggerated image".

For example, in a scene where an impact is needed, such as in robot animation or sports, expressions of extremely exaggerating the perspective have been often used. Such a flexible two-dimensional expression can be freely drawn by handwriting; however, in CG (computer graphics) video images constituted by camera parameters and 3D models, expressions may be difficult. Therefore, when combining a handwritten video image with a CG video image, the inconsistencies between the respective drawing methods may be revealed and a feeling that something is wrong in the image may be given.

There is a technology of reducing the disparity, by enlarging an object that is protruding out from the display surface of a 3D image (see, for example, Patent Document 1).

There is a technology of combining images from a plurality of viewpoints (cameras), and rendering the combined images on a two-dimensional plane (see, for example, Non-patent Document 1, Non-patent Document 2, Non-patent Document 3, Non-patent Document 4).

Patent Document 1: Japanese Laid-Open Patent Publication No. 2006-293792 (US2006/0232584 (A1))

Non-patent Document 1: CGWORLD.jp "New dynamics in Japanese animation CG" Autodesk 3ds Max 2011× PSOFT Pencil+3 (Fourth Part) http://cgworld.jp/feature/review/pencil+3-vol4.html Non-patent Document 2: Multi-perspective Modeling, Rendering, and Imaging SIGGRAPH ASIA 2008 Course Note, http://www.csbio.unc.edu/mcmillan/pubs/siga08-yu.pdf Non-patent Document 3: E-IMPACT ~3DCG imitating exaggerated expressions in Japanese animations~Feature•Latest digital content production technology, Video information media society academic journal, February 2012, 66(2), 102-105

Non-patent Document 4: "E-IMPACT: Exaggerated Illustrations using Multi-perspective Animation Control Tree Structure", ACE 2011-International Conference on Advances in Computer Entertainment Technology and DIMEA 2011-Digital Interactive Media Entertainment and Arts Conference (Nov. 8-Nov. 11, 2011). http://d1.acm.org/citation.cfm?id=2071502

SUMMARY OF THE INVENTION

According to an aspect of the embodiments, a drawing apparatus is used for drawing a three-dimensional model including a plurality of nodes present in a three-dimensional space, by using a plurality of viewpoints, the drawing apparatus including a memory configured to store drawing information including a correspondence relationship between the plurality of nodes and the plurality of viewpoints, and drawing parameters relevant to the plurality of viewpoints; and a CPU configured to transform the three-dimensional model into an image, by a plurality of polygons constituting the three-dimensional model, by using the drawing information, wherein the CPU changes the drawing information in response to a position or a state of a predetermined one or a plurality of the nodes satisfying a predetermined condition, and calculates drawing positions of vertices of the plurality of polygons, by using the viewpoints corresponding to the nodes to which the vertices belong, based on the changed drawing information.

According to an aspect of the embodiments, a drawing method is used for drawing a three-dimensional model including a plurality of nodes present in a three-dimensional space, by using a plurality of viewpoints, the drawing method being executed by a CPU by using drawing information stored in a memory, the drawing information including a correspondence relationship between the plurality of nodes and the plurality of viewpoints, and drawing parameters relevant to the plurality of viewpoints, the drawing method including changing the drawing information in response to a position or a state of a predetermined one or a plurality of the nodes satisfying a predetermined condition; and calculating drawing positions of vertices of a plurality of polygons constituting the three-dimensional model, by using the viewpoints corresponding to the nodes to which the vertices belong, based on the drawing information including changed drawing information.

According to an aspect of the embodiments, a drawing method is used for drawing a three-dimensional model including a plurality of nodes present in a three-dimensional space, by using a plurality of viewpoints, the drawing method being executed by a CPU by using drawing information stored in a memory, the drawing information including a correspondence relationship between the plurality of nodes and the plurality of viewpoints, and drawing parameters relevant to the plurality of viewpoints, the drawing method including acquiring a correspondence of regions from a plurality of regions of a standard model for which drawing information is defined and a plurality of regions of the three-dimensional model for which drawing information is not defined; applying the drawing information of the standard model to the three-dimensional model based on the correspondence of regions; storing the applied drawing information in the memory; and calculating drawing positions of vertices of a plurality of polygons constituting the three-dimensional model, by using the viewpoints corresponding to the nodes to which the vertices belong, based on the drawing information stored in the memory.

BRIEF DESCRIPTION OF THE DRAWINGS

Other objects, features and advantages of the present invention will become more apparent from the following detailed description when read in conjunction with the accompanying drawings, in which:

FIGS. 14A and 14B illustrate an example of avoiding the overlapping that is caused by the enlargement of an image according to exaggerated drawing;

FIG. 17 illustrates a process flow for smoothing the animation;

DETAILED DESCRIPTION OF THE PREFERRED EMBODIMENTS

To describe the basic production process according to an embodiment of the present invention, in the following, a description is given of regular video image generation and an exaggerated image expression. Note that the present specification complies with the following methods and notations; however, it is to be noted that the embodiments of the present invention are not limited the following methods and notations.

First, as a comparison target, a description is given of a video image drawing method by regular CG. Then, a specific example of video image exaggeration is given, and in this example, a description is given of an example of a mechanism of exaggerated drawing using a multi-camera system, as a basic embodiment common to the embodiments of the present invention.

In the present specification, a 3D model may be referred to as an object. Furthermore, a part of a 3D model (object) may be referred to as a partial object.

Basic Embodiment

[Vertex and Matrix Transformation]

The shape data of a CG model may be constituted by, for example, multiple triangular surfaces. The vertex data of each triangle is stored as a group of three-dimensional floating point data items (three-dimensional vector (x, y, z). The following description conforms to the CG processing mechanism such as OpenGL or Direct3D. A column vector obtained by adding a fourth-dimensional element w=1 to the three-dimensional vector (x,y,z) is expressed as $[x,y,z,1]^T$ ("$T$" means the transposition of a matrix; here, the column vector is expressed by transposition of a row vector, and a transformation process is expressed by a 4×4 matrix. The processes of translation/rotation/size transformation and projection transformation on the three-dimensional vector can be expressed only by affine transformation.

Figure 1A:
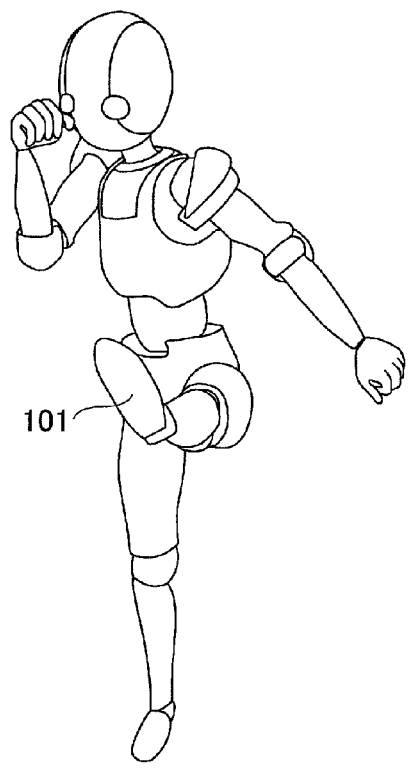
FIGS. 1A and 1B illustrate examples of exaggerated images.
Figure 1B:
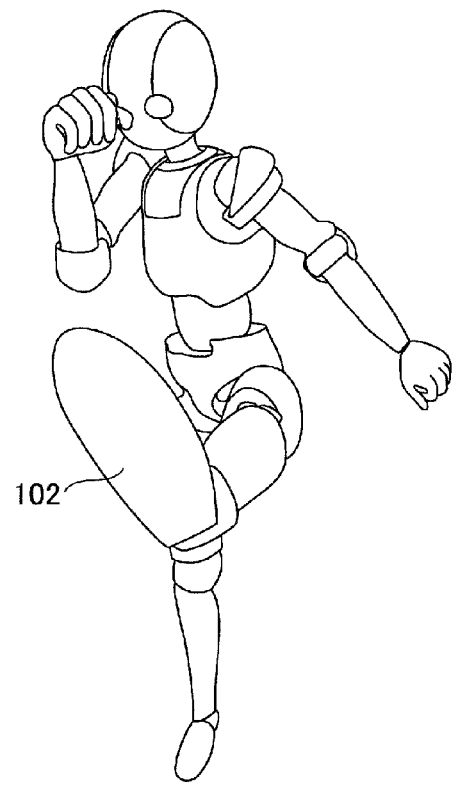
Figure 2A:
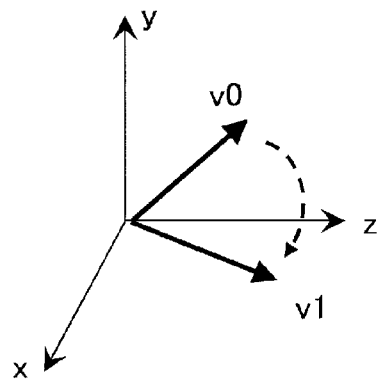
FIGS. 2A through 2C illustrate the transformation process on a vector.
Figure 2B:
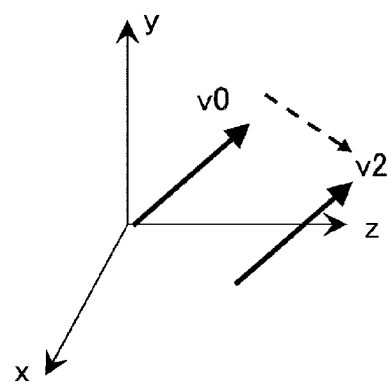
Figure 2C:
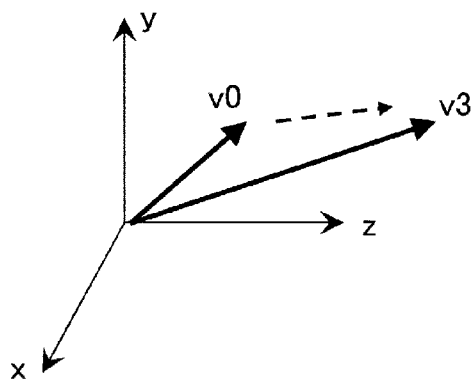

FIGS. 2A through 2C illustrate the transformation process on the vector. FIG. 2A illustrates an example where a vector $v_0$ is rotated to a vector $v_1$, by an angle θ around the x axis, by a rotation matrix R. This transformation process can be expressed as follows, where $v_0=[x,y,z,1]^T$.

[Equation 1]

$$v_1 = Rv_0 = \begin{bmatrix} 1 & 0 & 0 & 0 \\ 0 & \cos\theta & -\sin\theta & 0 \\ 0 & \sin\theta & \cos\theta & 0 \\ 0 & 0 & 0 & 1 \end{bmatrix}\begin{bmatrix} x \\ y \\ z \\ 1 \end{bmatrix} \quad (1)$$

FIG. 2B illustrates an example where a vector $v_0$ is moved in parallel to a vector $v_2$, by $t_x$ in the x axis direction, by $t_y$ in the y axis direction, and by $t_z$ in the z axis direction, by a translation matrix T. This transformation process can be expressed as follows.

[Equation 2]

$$v_2 = Tv_0 = \begin{bmatrix} 1 & 0 & 0 & t_x \\ 0 & 1 & 0 & t_y \\ 0 & 0 & 1 & t_z \\ 0 & 0 & 0 & 1 \end{bmatrix}\begin{bmatrix} x \\ y \\ z \\ 1 \end{bmatrix} \quad (2)$$

FIG. 2C illustrates an example where a vector $v_0$ is enlarged or reduced to vector $v_3$, by a scaling transformation matrix S. The transformation process of enlarging or reducing a vector by $s_x$ in the x axis direction, $s_y$ in the y axis direction, and $s_z$ in the z axis direction, can be expressed as follows.

[Equation 3]

$$v_3 = Sv_0 = \begin{bmatrix} s_x & 0 & 0 & 0 \\ 0 & s_y & 0 & 0 \\ 0 & 0 & s_z & 0 \\ 0 & 0 & 0 & 1 \end{bmatrix} \begin{bmatrix} x \\ y \\ z \\ 1 \end{bmatrix} \quad (3)$$

The result obtained by integrating these processes corresponds to changing the position and shape of an object, and is thus referred to as a modeling matrix M. For example, M is expressed as follows.

$$M = TRS \quad (3.5)$$

Note that in the above equation 3.5, if the matrices are multiplied with each other in a different order, a different transformation result will be obtained. Furthermore, in the following description, ellipsis notations are used, such as the usage of the x component of vector v is expressed as v·x, and the usage of the x component and the y component of vector v is expressed as v·xy. Furthermore, when matrices are multiplied with each other as Mv·xy, this expresses (Mv)·xy.

[Joint Structure]

When the CG model has a joint structure, the entire model is regarded as an assembly of partial elements, and the mode can be decomposed. In the present specification, a "partial element" may be referred to as a "bone". The assembly of vertex data belonging to a certain partial element is referred to as a segment. The partial elements are connected with adjacent partial elements at "joint points". A model that does not deform other than rotating around each other at joint points, is referred to as a rigid joint model. In the present specification, a unit that is a single cluster constituted by joints and segments, is referred to as a "node". A particular partial element is expressed by a subscript suffix. For example, a modeling matrix of a node whose ID number identifying a partial element is m, is described as $M_m$. Furthermore, a joint point of a node m (a point connected to the parent in the following parent-child relationship) is referred to as "joint m", and the vector expressing this position is expressed as $j_m$.

Figure 3A:
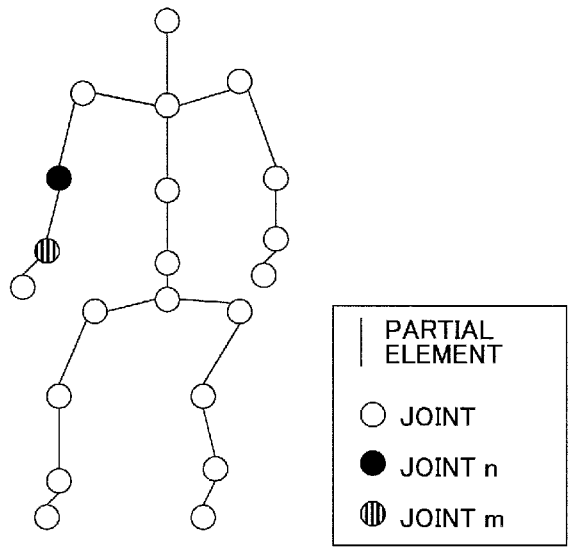
FIGS. 3A and 3B illustrate a rigid joint model of a human body.
Figure 3B:
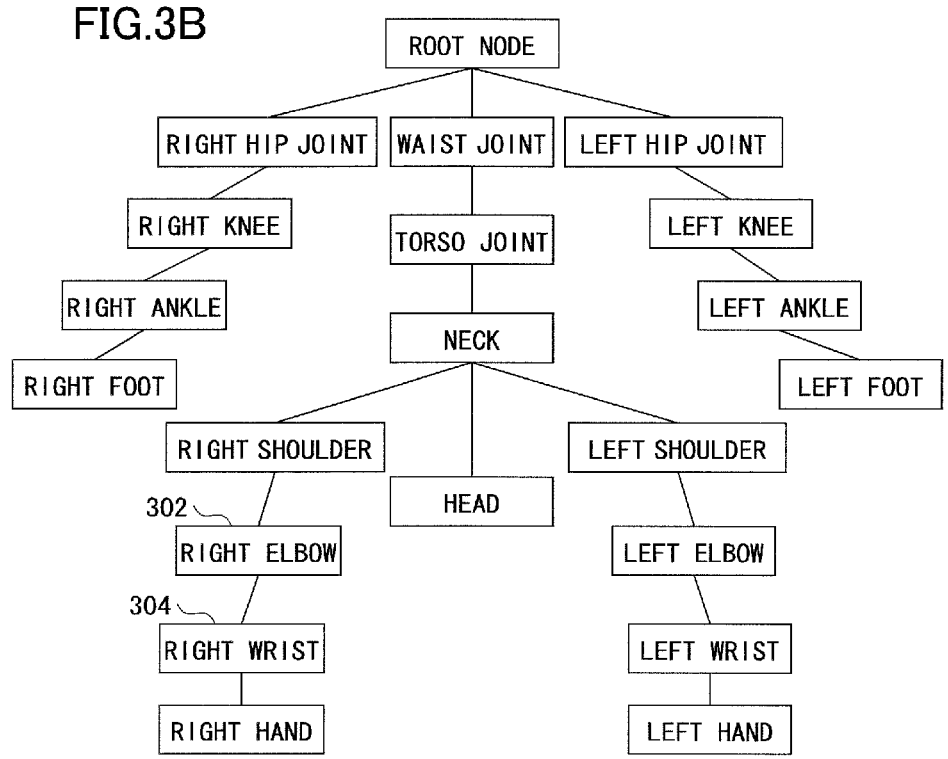

FIGS. 3A and 3B illustrate a rigid joint model of a human body. In the present specification, a rigid joint model is used as an example as a matter of ease of description. Note that the present invention is not limited to a rigid joint model. As illustrated in FIG. 3A, in a rigid joint model, it is preferable to set a parent-child relationship between nodes that are connected to each other. As illustrated in FIG. 3B, the rigid joint model is expressed by a tree structure linked from the topmost parent node (root node). The above-described methodology of controlling a joint model that can be calculated sequentially from a top level in such a simple tree structure, is referred to as forward kinematics. Assuming that the ID number of a target node is m, the ID number of the parent node is n, and the vector expressing the position of the joint point (joint m) in a basic posture before moving is $j^0_m$, when the modeling matrix $M_n$ is fixed at the parent node 302 (node n), the position $j_m$ of the joint m is uniquely fixed at $j_m = M_n j^0_m$. A child node 304 (node m) may have only the rotational degrees of freedom centering around this joint m.

[Viewpoint Matrix and Projection Matrix]

In order to transform a three-dimensional position into a two-dimensional image, a viewpoint matrix V and a projection matrix P are used. The viewpoint matrix expresses the position and the direction of a camera (viewpoint), and the projection matrix indicates the rule for projecting three-dimensional information into two-dimensional information.

The viewpoint matrix is defined by combining the parallel translation of transforming the position $e_0$ of the viewpoint into the origin, and a rotation matrix of setting the direction $\theta_0$ of the camera to the Z axis.

The projection matrix P is, for example, a matrix having the following format.

[Equation 4]

$$P = \begin{bmatrix} p_{00} & 0 & 0 & 0 \\ 0 & p_{11} & 0 & 0 \\ 0 & 0 & p_{22} & p_{23} \\ 0 & 0 & 1 & 0 \end{bmatrix} \quad (4)$$

The amount $[x/w, y/w, z/w, 1]^T$, which is obtained by transforming the vertex coordinates by this matrix and normalizing the transformation result by dividing $[x,y,z,w]^T$ by the value of w, is referred to as a view volume. Each of x/w, y/w corresponds to a coordinate position on a two-dimensional image, and $-1 < x/w < 1$, $-1 < y/w < 1$, $0 < z/w < 1$ is the area of a rectangular frustum indicating the drawing target. The method of creating this projection matrix is described in a reference document such as http://www.terathon.com/gdc07_lengyel.pdf.

[Drawing Process Flow]

The process flow of a drawing process performed in each frame of a CG video is described below.

Figure 4:
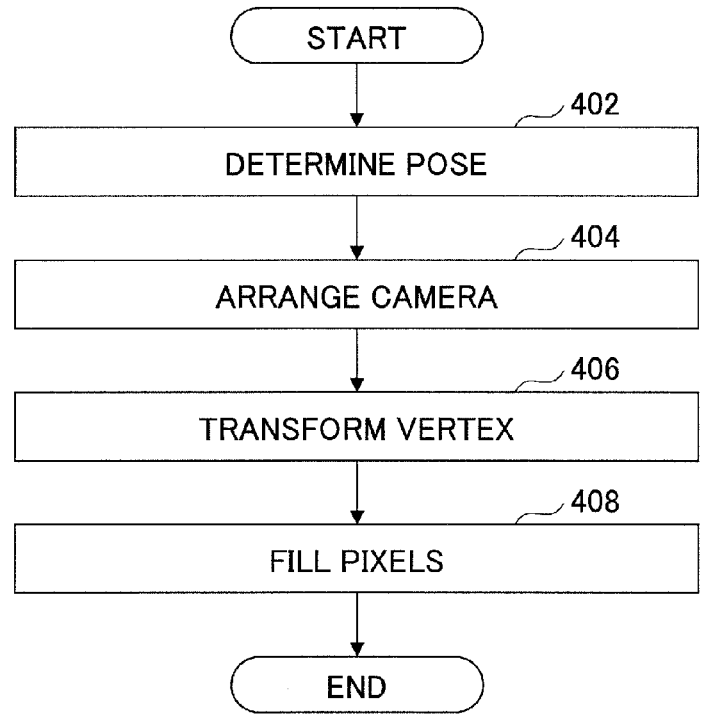
FIG. 4 illustrates an example of a process flow of creating a CG video image.

FIG. 4 illustrates an example of a process flow of creating a CG video image. Specifically, this process flow is constituted as follows.

In step 402, the condition of arranging a character model in a scene, and the pose of the joint model are determined.

In step 404, camera parameters are applied, and the viewpoint position, the direction, and/or the angle of view are set.

In step 406, the coordinates of the respective vertices constituting the model are calculated, and projection transformation is performed.

In step 408, the pixels in the face made by the vertices are filled (rasterizing is performed).

Information including the correspondence relationships between the plurality of nodes and the plurality of viewpoints, the influence rate applied by each of the plurality of nodes with respect to the drawing positions of the respective vertices in the plurality of polygons constituting the three-dimensional model, and drawing parameters of each of the plurality of viewpoints, is referred to as drawing information.

[Step 402: Determination of Pose]

Figure 5A:
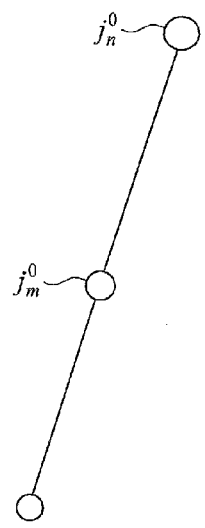
FIGS. 5A and 5B illustrate an example of animation according to forward kinematics.
Figure 5B:
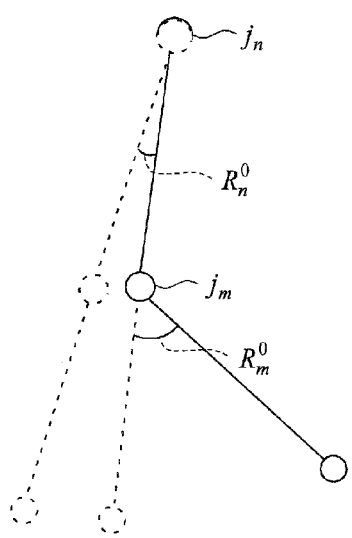

FIGS. 5A and 5B illustrate an example of the animation according to forward kinematics. Based on the procedures of forward kinematics, the modeling matrix of each node is determined. (Note that this determination procedure is indicated in, for example, the following reference document. http://www.tmps.org/index.php?%BD%E7%B1%BF%C6%B0%B3%D8)

(i) In order to determine the pose of the character, the direction of each node is determined (FIG. 5A). With respect to all nodes (m=0, 1, 2, . . . , M−1), the information $R^0_m$ of the rotational angle at the joint part (m) is read.

(ii) In the order of connection from the parent node, the positions of the nodes are determined. A node m is connected to a node n which is its parent, by a joint m. It is assumed that the position of the joint m in the basic pose is $j^{o}_{m}$, and the position of the joint m after reading the pose and rotating is $j_m$. When the modeling matrix $M_n$ of the parent is already determined, the modeling matrix $M_m$ of this node is determined as follows (FIG. 5B).

The transformation $M_m p$ is a process of applying pose information to the point P accompanying the node m, and is achieved by an operation of rotating by $R_m$ centering around the joint m, and the position $j_m$ of the joint m (determined by transformation $M_n$ of parent node). That is:

$$j_m = M_n j^{o}_{m}$$

$$R_m = R^{o}_{m} R_n$$

$$M_m p = R_m (p - j^{o}_{m}) + M_n j^{o}_{m}$$

(iii) The operation (ii) is repeated from the parent node to the child node, and the modeling matrix M can be obtained for all nodes.

[Step 404: Arrangement of Camera (Setting of Camera Parameters)]

The camera parameters (position e of viewpoint, direction of camera θ, angle of view) are set, and from these information items, the viewpoint matrix V and the projection matrix P are created. The angle of view corresponds to the focal length at the lens of the camera.

The viewpoint matrix V is defined as V=RT, by a translation matrix T in which the origin is the viewpoint position (p is moved in parallel to p-e), and a rotation matrix R of rotating the sight line direction θ along the Z axis.

In the projection matrix, the matrix having the format as described above is set as follows.

[Equation 5]

$$P = \begin{bmatrix} p_{00} & 0 & 0 & 0 \\ 0 & p_{11} & 0 & 0 \\ 0 & 0 & p_{22} & p_{23} \\ 0 & 0 & 1 & 0 \end{bmatrix} \quad (5)$$

In this case, $p_{00}$, $p_{11}$ are the angle of views in the horizontal direction and the vertical direction, respectively (a reciprocal of the tangent of half).

[Step 406: Transformation of Vertex]

The position after deformation is calculated with respect to each vertex of the model (the position coordinate before deformation is p). Assuming that the node to which the vertex belongs is m, $[x,y,z,w]^T = PVM_m p$ is calculated.

The vertex is finally mapped on a point (x/w,y/w) in the two-dimensional image.

Furthermore, the depth value z/w is obtained from this calculation. This depth value is used for the sorting for comparing the depth order of the surfaces. Details of this point are described below.

[Step 408: Filling Pixels]

The pixels in the two-dimensional image are filled (a rasterizing process is performed).

In this filling process, the color of the triangle in the front finally needs to be visible, and therefore the drawing order is important. In order to follow this depth order, the depth value z/w obtained by transformation of the vertex is used to sort the surfaces, and the furthest surface is drawn first, and closer surfaces are drawn by overwriting the drawn surfaces.

With respect to the triangular surfaces that have been sorted, reference is made to the three vertices constituting the triangle. The pixels in the area surrounded by these vertices are filled by a color specified for the surface.

In the above standard drawing method, geometric projection from three-dimension to two-dimension is performed by a perspective projection matrix P. Next, a description is given of a method of generating an exaggerated video image, by making a comparison with the above video image generating procedures.

[Generation of Exaggerated Video Image]

In order to generate an exaggerated image, there are mainly two types of methods. The first method is to enlarge the shape itself of the portion of the CG model, and the other method uses Multi-perspective Rendering (MPR), which is a technique of processing the camera parameters for generating perspective images.

"1. Shape Processing"

As an implementation example of the first method of processing the portion of the CG model, there is a Pencil+3 perspective deformation modifier (see, for example, Non-patent Document 1).

In this example, a video image is created, that appears as though different lens parameters are applied according to the Z depth of the CG. Note that the model shape is processed according to the Z depth, and therefore when an object other than the character, for example, a background model is appearing in the same scene as the character, the model of the corresponding depth may become warped.

"2. Multi-Perspective"

The second method MPR is a method of combining the effects of different perspective projections into a single picture. Details of the existing technology of MPR are exemplified in Non-patent Document 2.

In MPR, fragments of an image from different viewpoints are combined in a single picture to create the video image. An example in which the respective parts of a model are warped and joined, and a video image like a cubism painting is created, is given as a prior art example.

Furthermore, Patent Document 1 proposes a method of reducing the disparity by using this method to enlarge an object sticking out from the display surface of the three-dimensional video image.

Furthermore, Non-patent Document 3 and Non-patent Document 4 propose examples of a method of creating the above exaggerated image by using MPR.

[Exaggerated Image by Multi-Perspective Combination]

In the example of Non-patent Document 1, the shape is changed to obtain an exaggerated expression, whereas the exaggerated drawing algorithm indicated in Non-patent Document 3 and Non-patent Document 4 exaggerates the perspective effect at the stage of applying the perspective projection P.

[Basic Concept]

Figure 6A:
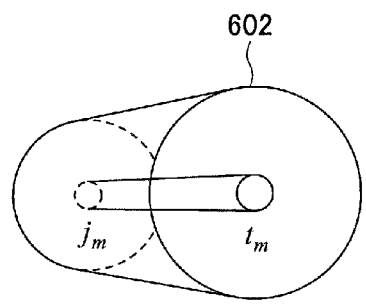
FIGS. 6A and 6B illustrate an example of a perspective exaggerated expression of a cylinder.
Figure 6B:
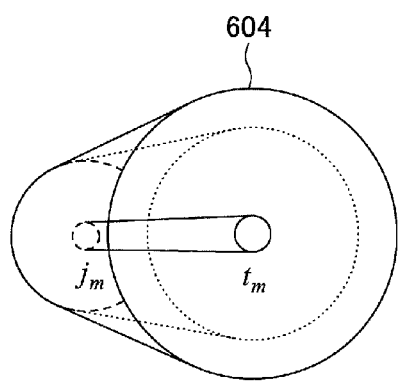

FIGS. 6A and 6B illustrate an example of a perspective exaggerated expression of a cylinder. A cylinder corresponding to a node m and the center axis of the cylinder are illustrated. FIG. 6A illustrates a regular perspective image. Meanwhile, in FIG. 6B, the difference in the enlargement ratio of the appearance according to the distance (difference between circle 602 and circle 604), is largely exaggerated. A center axis set in the cylinder, and both end points of the center axis are set as feature points. A three-dimensional point at the root of the cylinder is set as a joint m, and the position of the joint m is set as point $j_m$. Furthermore, the three-dimensional point at the leading end of the cylinder is referred to as a "target m", and the position of the target m is set as $t_m$.

As described above, by determining the camera parameters such that images created by pseudo-viewpoint parameters of the parent and by the pseudo-viewpoint parameters of the child share a joint point and a target point with each other, the angle formed by the respective axes does not appear unnatural in the final image.

Figure 7:
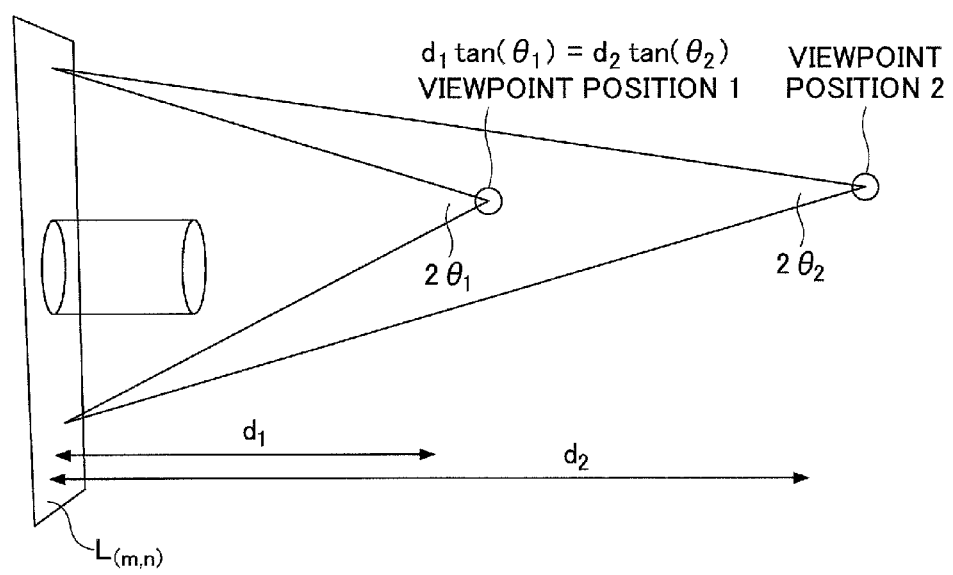
FIG. 7 illustrates the control of the perspective by the movement of a camera and an angle of view operation.

FIG. 7 illustrates the control of the perspective by the movement of a camera and an angle of view operation. FIG. 7 is a pattern diagram indicating the relationship between the camera and the angle of view in this process. The camera is moved to a position closer to the cylinder from $d_2$ to $d_1$, and (half of) the angle of view is spread out from $\theta_2$ to $\theta_1$, and therefore it is possible to make the top surface $t_m$ of the cylinder appear to be large, while the appearance of the surface including the bottom surface of the cylinder $j_m$ substantially does not change.

[Combination of Multiple Stages]

Figure 8:
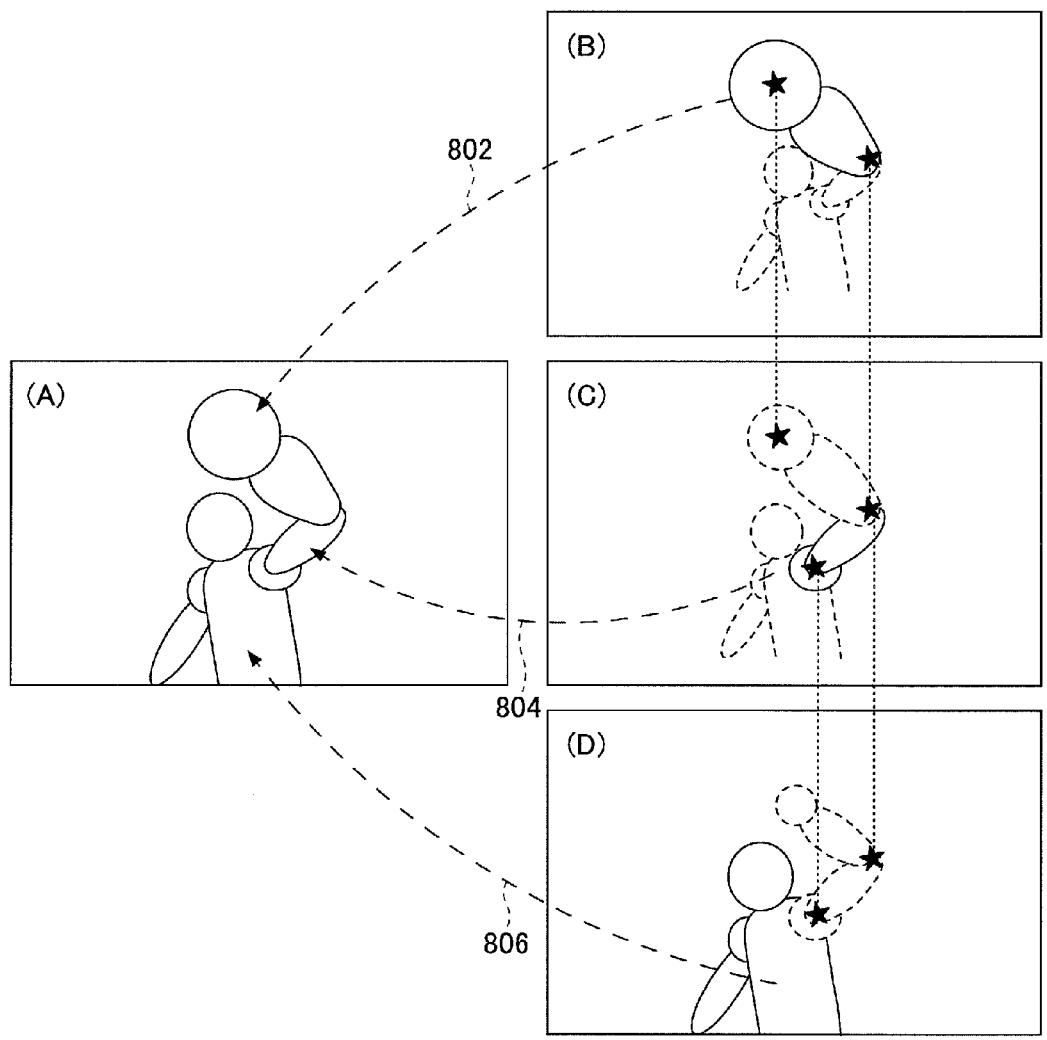
FIG. 8 is a pattern diagram of an example of an exaggerated expression of a joint model.

FIG. 8 is a pattern diagram of a case where a joint model is drawn by the above method. As illustrated in FIG. 8, an exclusive-use camera is prepared for each region separated by joints, and these cameras are referred to as "pseudo-cameras". These pseudo-cameras are arranged at different positions, and take images of the respective regions. FIG. 8 (B) through (D) are images of a model of the same pose taken by three different pseudo-cameras. FIG. 8(A) is an exaggerated image created by linking together these three images at the joint parts, as indicated by arrows 802, 804, and 806.

FIG. 8 illustrates an example of an exaggerated expression of a joint model. It is possible to realize an exaggerated expression by handwritten animation, by linking together the images having different perspectives as described above. By using the MPR as described above, the perspective exaggerated expression can be described as a "change in distance" rather than a "change in shape". Accordingly, the perspective exaggerated expression can be expressed more naturally.

[Restriction Conditions]

When only moving each pseudo-camera close to the model, the pose in the two-dimensional image may appear unbalanced. In order to change only the expression of the distance and size of the perspective while maintaining the impression of the pose in the two-dimensional image, it is preferable that the arrangement positions of the pseudo-cameras are in coordination with each other. In this case, a pseudo-projection matrix $P_m$ and a pseudo-viewpoint matrix $V_m$ are preferably created to satisfy the following restriction conditions.

[Restriction Condition 1]

Near the joint m, the image of the pseudo-camera of the node m and the image of the pseudo-camera of the parent node n, preferably have substantially the same position and size. According to this restriction, the joints appear to be "linked".

A plane which includes the joint point $j_m$ and which is perpendicular to the sight line direction, is assumed to be $L(m,n)$. With respect to the point p on the $L(m,n)$, the two-dimensional coordinates where the point p is projected are obtained by performing a pseudo-projection process $P_n V_n$ in the parent layer (node n). Also, with respect to the point p on the $L(m,n)$, the two-dimensional coordinates where a point p is projected, are obtained by performing a pseudo-projection process $P_m V_m$ in this layer (node m). These two sets of two-dimensional coordinates obtained as described above match each other.

That is to say, the following equation is established.

[Equation 6]

$$\frac{P_n V_n p \cdot xy}{P_n V_n p \cdot w} = \frac{P_m V_m p \cdot xy}{P_m V_m p \cdot w}, \; \forall \, p \,|\, V_n p \cdot z = V_n j_m \cdot z \quad (6)$$

[Restriction Condition 2]

The two-dimensional positions where a target m is projected preferably substantially match each other. By this restriction, the orientations of the object appear to match each other.

The two-dimensional coordinates where the target point $t_m$ is projected, are obtained by performing a pseudo-projection process $P_n V_n$ in the parent layer (node n). Also, the two-dimensional coordinates where the target point $t_m$ is projected, is obtained by performing a pseudo-projection process $P_m V_m$ in this layer (node m). These two sets of two-dimensional coordinates obtained as described above match each other.

That is to say, the following equation is established.

[Equation 7]

$$\frac{P_n V_n t_m \cdot xy}{P_n V_n t_m \cdot w} = \frac{P_m V_m t_m \cdot xy}{P_m V_m t_m \cdot w} \quad (7)$$

When these restriction conditions are satisfied, it is possible to create an image in which the visual perspective around the point $t_m$ is enlarged, while a line segment from $j_m$ to $t_m$ indicating the axis of the cylinder is occupying the same position in a two-dimensional manner. Note that the present invention is not limited to the above methods.

[Configuration Elements of Drawing Method]

The data configuration elements needed for drawing a video image by a drawing method are described below.

The node part stores the following data.
(A) The information that is preferably stored in advance is as follows.
 Position $t^0_m$ of a target point in a basic pose
 Position $j^0_m$ of a joint point in a basic pose
 Exaggeration coefficient $\eta_m$
 Link n to parent node
(B) The information that is dynamically determined is as follows.
 Position $t_m$ of present target point
 Position $j_m$ of present joint point
 Modeling matrix $M_m$
 Pseudo-viewpoint position $e_m$
 Pseudo-viewpoint matrix $V_m$
 Pseudo-projection matrix $P_m$
 The configuration of each vertex is as follows.
(C) The information that is preferably stored in advance is as follows.
 Vertex position $p^0=[x,y,z,1]^T$ in basic pose
 Link m to node
(D) The information that is dynamically determined is as follows.
 Present vertex position $p=M_m p^0$

[Drawing Process Flow of Basic Method]

The drawing process flow of the basic method according to an embodiment of the present invention may be performed by the following procedures.

The drawing process flow of the basic method is similar to that of FIG. 4; however, in the following embodiment, it is assumed that the following basic method is performed. Note that the present invention is not limited to this basic method.

In arranging the camera (step 404) and in transforming the vertex (step 406), it is preferable to prepare and use a plurality of viewpoint matrices and projection matrices. In the following, details are described with reference again to FIG. 4.

[Step 402: Determination of Pose]

Based on the method described above, a modeling matrix $M_m$ is set for each node m. Furthermore, the present position $t_m = M_m t^0_m$ of the target point transformed by this modeling matrix, and the present position $j_m = M_m j^0_m$ of the joint point, are respectively calculated.

[Step 404: Arrangement of Camera]

First, the basic camera parameters (position $e_0$ of viewpoint, direction of camera $\theta_0$, angle of view) are set. From these information items, the viewpoint matrix $V_0$ and the projection matrix $P_0$ are created. The viewpoint matrix $V_0$ is defined as $V_0 = R_0 T_0$, by a translation matrix $T_0$ in which the origin is the viewpoint position $e_0$ (p is moved in parallel to $p - e_0$), and a rotation matrix $R_0$ of rotating the sight line direction $\theta_0$ along the Z axis.

In the projection matrix, the matrix having the format as described above is set as follows.

[Equation 8]

$$P = \begin{bmatrix} p_{00} & 0 & 0 & 0 \\ 0 & p_{11} & 0 & 0 \\ 0 & 0 & p_{22} & p_{23} \\ 0 & 0 & 1 & 0 \end{bmatrix} \quad (8)$$

In this case, $p_{00}$, $p_{11}$ are the angle of views in the horizontal direction and the vertical direction, respectively (a reciprocal of the tangent of half).

In each segment m, camera parameters (position of viewpoint, camera direction, angle of view) are set. From this information, the viewpoint matrix $V_m$ and the projection matrix $P_m$ are created.

[Step 404 Part 1: Determine Provisional Position of Pseudo-Viewpoint]

The position of the pseudo-viewpoint is determined.

On a line connecting the pseudo-viewpoint positions $e_n$ of the parent layer and $t_m$, a pseudo-viewpoint position $e_m$ is set.

$$e_m = (e_n + \eta_m t_m)/(1 + \eta_m)$$

In the present specification, this ratio is referred to as an "exaggeration coefficient", and the value is set as $\eta_m$. As this value, a constant parameter stored in the node structure body in advance, is preferably read and used. By the exaggeration coefficient, it is possible to adjust the level of exaggeration. The higher the exaggeration coefficient, the higher the level of exaggeration. When the exaggeration coefficient is zero, the image becomes the same as the image seen from the pseudo-viewpoint of the parent layer.

From the pseudo-viewpoint position $e_m$ and the camera direction, a pseudo-viewpoint matrix $V_m$ is created. The direction of the pseudo-camera is preferably the same direction as that of the basic camera (a camera that is not a pseudo-camera).

[Step 404 part 2: Determine Zoom Correction Amount of Pseudo-Projection Matrix]

The angle of view of the pseudo-projection matrix (corresponding to focal length of a camera lens) is corrected, such that the scale of the image taken at the pseudo-projection matrix of the parent node and the scale of the image taken at the pseudo-projection matrix of the present node match each other, in a plane $z = V_n j_m \cdot z$ (in the coordinate system of viewpoint $e_n$) including the joint point $j_m$.

The pseudo-projection matrix $P_n$ of the parent node is already determined, and is expressed as follows.

[Equation 9]

$$P_n = \begin{bmatrix} p_{n00} & 0 & p_{n02} & 0 \\ 0 & p_{n11} & p_{n12} & 0 \\ 0 & 0 & p_{n22} & p_{n23} \\ 0 & 0 & 1 & 0 \end{bmatrix} \quad (9)$$

Based on the above, the projection matrix $P_m$ of the node m is obtained. The component of $P_m$ is expressed as follows.

[Equation 10]

$$P_m = \begin{bmatrix} p_{m00} & 0 & p_{m02} & 0 \\ 0 & p_{m11} & p_{m12} & 0 \\ 0 & 0 & p_{m22} & p_{m23} \\ 0 & 0 & 1 & 0 \end{bmatrix} \quad (10)$$

First, a pseudo-projection matrix $P'_m$ is created, in which only the angle of view is corrected as follows.

[Equation 11]

$$P'_m = \begin{bmatrix} p_{n00} \dfrac{V_m j_m \cdot z}{V_n j_m \cdot z} & 0 & 0 & 0 \\ 0 & p_{n11} \dfrac{V_m j_m \cdot z}{V_n j_m \cdot z} & 0 & 0 \\ 0 & 0 & p_{n22} & p_{n23} \\ 0 & 0 & 1 & 0 \end{bmatrix} \quad (11)$$

[Step 404 Part 3: Determine Oblique Correction Amount of Pseudo-Projection Matrix]

The oblique correction amount of the pseudo-projection matrix is corrected, and the shift amount is set such that the image taken by the pseudo-projection matrix of the parent node and the image taken by the pseudo-projection matrix of the present node match each other, in a plane $z = V_n j_m \cdot z$ (in the coordinate system of viewpoint $e_n$) including the joint point $j_m$.

With respect to the pseudo-projection matrix $P'_m$ before setting the shift amount, the (0,2) component and the (1,2) component are corrected as follows, which is set as $P_m$.

[Equation 12]

$$P_{m02} = \dfrac{P_n V_n j_m \cdot x}{P_n V_n j_m \cdot w} - \dfrac{P'_m V_m j_m \cdot x}{P'_m V_m j_m \cdot w}$$

$$P_{m12} = \dfrac{P_n V_n j_m \cdot y}{P_n V_n j_m \cdot w} - \dfrac{P'_m V_m j_m \cdot y}{P'_m V_m j_m \cdot w} \quad (12)$$

According to the procedures of the above step 404 part 1 through step 404 part 3, it is possible to sequentially arrange pseudo-cameras, starting from the parent node in a top-down manner.

[Step 406: Transformation of Vertex]

A node m corresponding to each vertex of a model (the position coordinate in the basic pose is) $p^0$) is searched, and the pseudo-viewpoint matrix and the pseudo-projection matrix of the node are used to calculate the position in the view volume in the exaggerated expression by the following equation.

$$[x,y,z,w]^T = P_m V_m M_m p^0$$

The vertex is mapped on a point (x/w,y/w) in the two-dimensional image.

Furthermore, the regular viewpoint matrix of the basic camera and a projection matrix are used, to calculate the value $[x_0, y_0, z_0, w_0]^T = PVM_m p^0$ of the position in a regular view volume (coordinate values obtained by projection transformation by using a basic camera), and $z_0/w_0$ is preferably set as the perspective depth value. This is done in order to have consistency in the comparison of the perspective depth values between objects drawn with different pseudo-cameras. This perspective depth value may be used for drawing an image at the front that is to be filled in step 408 described below, by using, for example, a Z buffer.

[Step 408: Filling Pixels]

In each surface, the pixels in the area surrounded by the vertices are filled. Furthermore, at this time, the drawing is started from the surface having the greatest depth value $z_0/w_0$ (furthest depth), and a closer surface is overwritten onto the surfaces already drawn.

By drawing images according to the above procedures, an image in which the perspective effect is exaggerated is generated.

The above is a description of a method of drawing an exaggerated image, as the basic embodiment. The above technique is developed to further disclose the following embodiments.

First embodiment: Smooth joining of joint parts
Second embodiment: Resolving nonconformity in exaggeration
Third embodiment: Smoothing process of animation
Fourth embodiment: Setting of exaggeration coefficient parameter
Fifth embodiment: Dynamic adjustment of exaggeration amount
Sixth embodiment: Picking process First Embodiment

[Smooth Joining of Joint Parts]

When a rigid joint model is to hold a particular pose, each region is to be rotated and moved. However, in order to make the connections of the joint regions of a model such as a human being or an animal appear to be natural, even when the joint is bent, the skin covering the joint is preferably smoothly joint.

As a method of expressing such a model, a technique referred to as skin mesh or envelope may be used.

Figure 9:
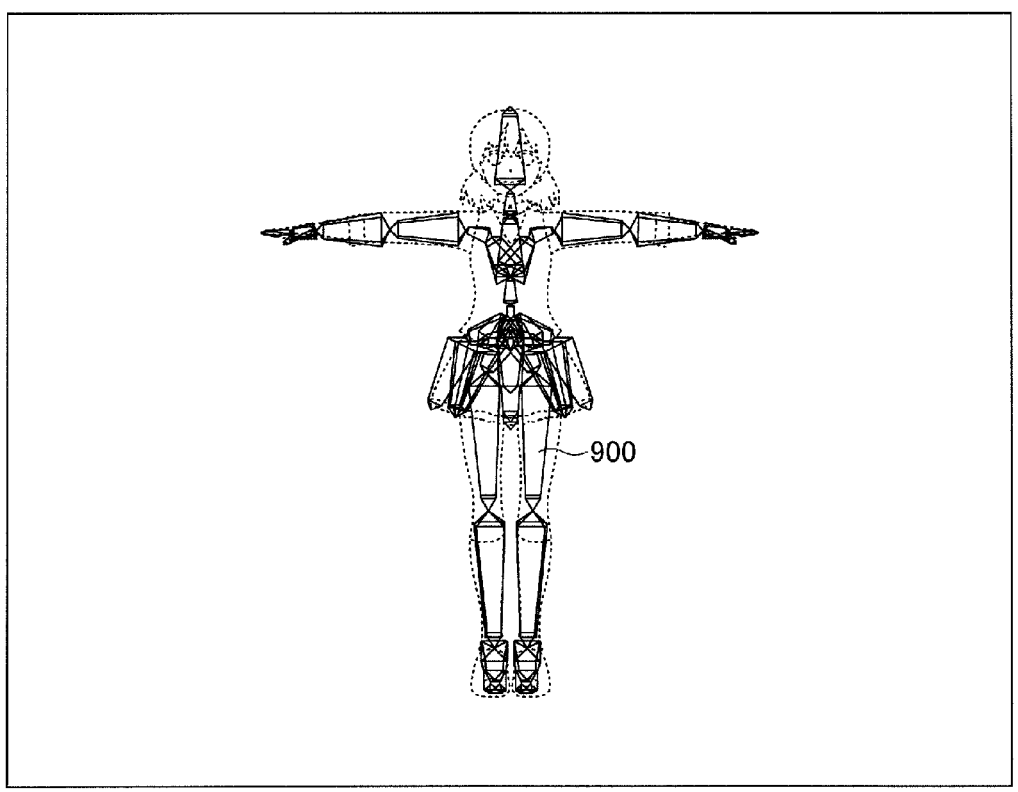
FIG. 9 illustrates an example of bones applied to a human-type model.

By these techniques, a non-displayed object may be prepared, and the shape of the model may be changed in accordance with the deformation of the non-displayed object. For example, when a human-type model is operated with skin mesh, a non-displayed rigid object referred to as a skeleton or bones is set as the framework (bones) inside the model, and this framework is moved to express a pose. FIG. 9 illustrates an example of bones 900 applied to a human-type model.

In accordance with the rotation transformation and the translation transformation of the bones, the positions of the respective vertices of the model surface are determined. Particularly, the vertex around a joint between segments is affected by two or more bones, and a point which interpolates the positions determined by the transformation of the bones may be set as the position of the vertex.

A method of creating a video image of a model to which the envelope process is applied, is exemplified below.

In order to realize this operation in an exaggerated expression, the bone that each vertex is influenced by, and weighted values of the influence rates are preferably stored.

[Overview of Process]

With respect to a model using the skin mesh process, there are cases where it is difficult to realize exaggerated drawing by using a multi-camera system, using only the above-described basic technique. Therefore, as a process of performing exaggerated drawing on an object using skin mesh, it is preferable to apply a viewpoint matrix and a projection matrix to the vertex and create a four-dimensional value of the homogeneous expression, and then divide this value by a w value to transform this into position information on a regular two-dimensional image. Subsequently, an interpolation process according to the influence rate is preferably performed.

[Configuration Elements]

Figure 10:
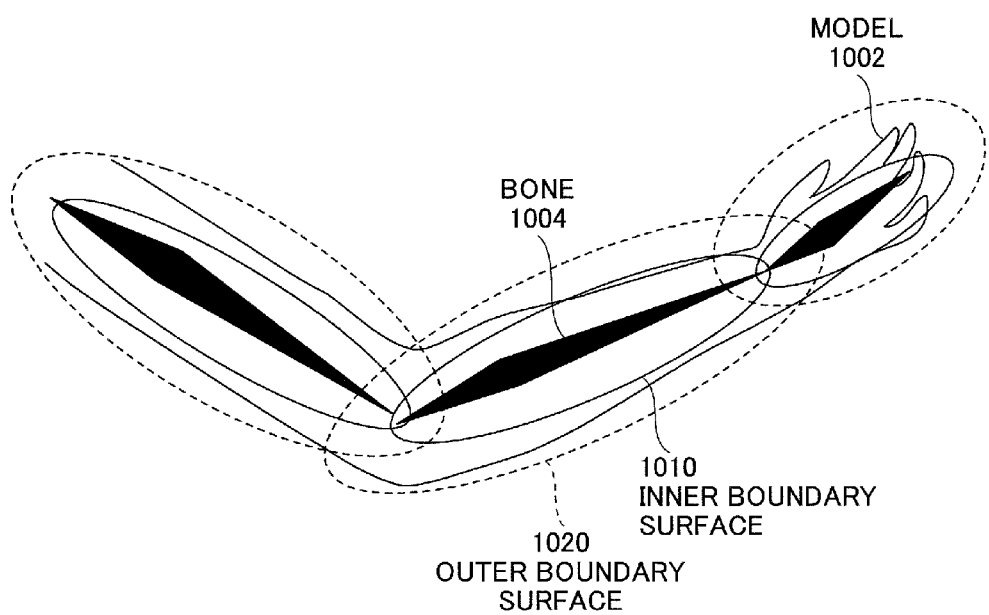
FIG. 10 illustrates an example of joints and envelopes.

FIG. 10 illustrates an example of joints and envelopes. As described above, a three-dimensional model 1002 is constituted by, for example, multiple triangular surfaces (polygons), and the vertex data of each triangle is stored as three-dimensional vectors.

The bone has a range of applying an influence to a vertex. In the present embodiment, the geometric data indicating the range of influence applied by a bone 1004, is referred to as an envelope.

A setting example of the influence range by the envelope is described below. An inner boundary surface 1010 is provided around the bone, and an outer boundary surface 1020 is provided around the inner boundary surface 1010. Assuming that the influence rate from the bone to the vertex is q, 1.0 may be applied to the vertex inside the inner boundary surface 1010, 0.0 may be applied to the vertex outside the outer boundary surface 1020, and a value (value of vertex of polygon) interpolated according to the distance from the two boundary surfaces may be applied to the vertex between the two boundary surfaces.

At the part around the joint, the influence rate of a plurality of envelopes are applied to a single vertex. Each vertex holds data $[m_0, m_1, m_2, \ldots, m_{K-1}]$ created by listing the ID numbers of the nodes (bones) which are to be referred to, and data $[q_0, q_1, q_2, \ldots, q_{K-1}]$ created by listing the influence rates applied to the vertex by respective nodes. The sum of the influence rates is preferably set to 1, i.e., $\Sigma q_k = 1$. In the following, the sum of the influence rates is assumed to be 1.

(A) Configuration of Node:
The information that is preferably stored in advance is as follows.

Position $t^0_m$ of a target point in a basic pose
Position $j^0_m$ of a joint point in a basic pose
Geometric model indicating inner boundary surface (assembly of non-visible vertices)
Geometric model indicating outer boundary surface (assembly of non-visible vertices)

Exaggeration coefficient $\eta_m$
Link n to parent node

The information that is dynamically determined is as follows.

Position $t_m$ of present target point
Position $j_m$ of present joint point
Present posture of geometric model indicating inner boundary surface (assembly of non-visible vertices)
Present posture of geometric model indicating outer boundary surface (assembly of non-visible vertices)
Modeling matrix $M_m$
Pseudo-viewpoint position $e_m$
Pseudo-viewpoint matrix $V_m$
Pseudo-projection matrix $P_m$ (B) Configuration of the Vertex The information that is preferably stored in advance is as follows.

Vertex position $p^0$ in basic pose
Link to node (list) $[m_0, m_1, m_2, \ldots, m_{K-1}]$
Influence rate (list) $[q_0, q_1, q_2, \ldots, q_{K-1}]$ The information that is dynamically determined is as follows.

Present vertex position $\Sigma q_k M_{mk} p^0$

[Drawing Process Flow]

An example of the overall drawing process flow is described below. The flow of FIG. 4 is used for the description.

[Overall Flow]

The overall process flow of the present embodiment is substantially the same as the other embodiment (FIG. 4). However, it is to be noted that there is a major change in step 406 "transformation of vertex".

[Step 402: Determination of Pose]

Based on the method described above, a modeling matrix $M_m$ is set for each node m. Furthermore, the present position $t_m = M_m t^0_m$ of the target point transformed by this modeling matrix, and the present position $j_m = M_m j^0_m$ of the joint point, are respectively calculated. The specific method may be executed according to the basic embodiment described above.

[Step 404: Arrangement of Camera]

The camera parameters (position of viewpoint, direction of camera, angle of view) are set at each node m. From these information items, the viewpoint matrix $V_m$ and the projection matrix $P_m$ are created. The specific method may be executed according to the basic embodiment described above.

[Step 406: Transformation of Vertex]

The transformation of the vertex may also be executed according to the basic embodiment described above. Note that the following points can be changed.

Figure 11:
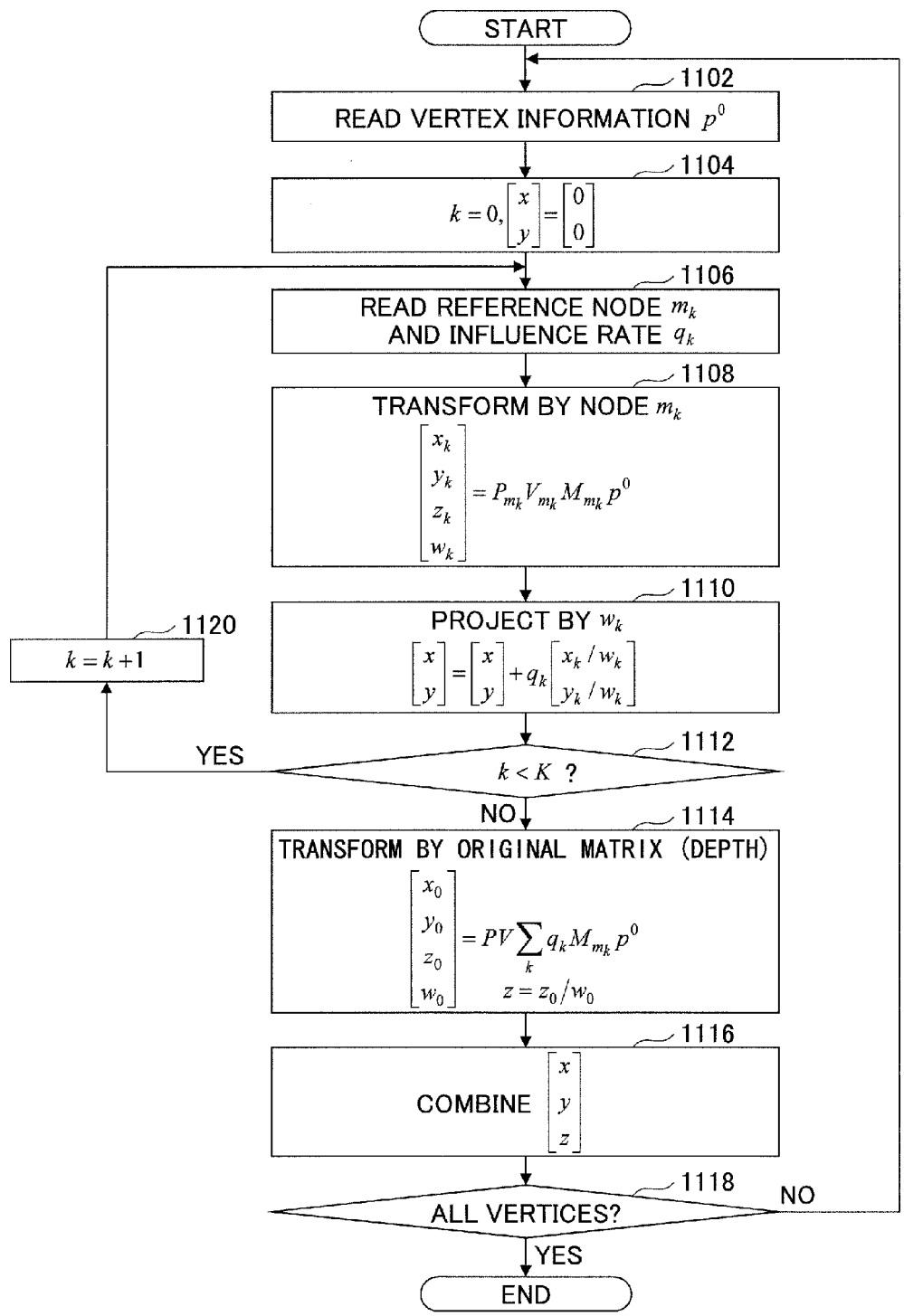
FIG. 11 illustrates a flow of transforming the vertex of a polygon by adding the influence rate of the bone according to a first embodiment.

FIG. 11 illustrates details of the flow of transforming the vertex of a polygon by adding the influence rate of the bone.

In step 1102, the position coordinate $p^0$ of the vertex of the polygon in the basic pose is read.

In step 1104, the parameters are initialized.

In step 1106, the list of bones $[m_0, m_1, m_2, \ldots, m_{K-1}]$ associated to each vertex of the polygon, and the influence rate $[q_0, q_1, q_2, \ldots, q_{K-1}]$ on the vertex, are read. K expresses the number of bones that influence the vertex, which is a unique value for each vertex.

In step 1108, for each of $m_k$ (k=0, 1, . . . , K−1), the coordinate transformation of the vertex is calculated.

$$[x_k, y_k, z_k, w_k]^T = P_{mk} V_{mk} M_{mk} p^0$$

In step 1110, the vertex is mapped on a point in the two-dimensional image, and is multiplied by the influence rate and added together.

$$(\Sigma q_k(x_k/w_k), \Sigma q_k(y_k/w_k))$$

Steps are repeated K times by step 1112 and step 1120.

In step 1114, by the following equation, the depth value is calculated by a regular projection matrix, and $z_0/w_0$ is set as the perspective depth value.

$$[x_0, y_0, z_0, w_0]^T = PV \Sigma q_k M_{mk} p^0$$

In step 1116, the coordinates of the vertices of the polygon (x, y) and z are combined.

In step 1118, the above calculation is repeated for all vertices of the polygon.

[Step 408: Filling Pixels]

In each surface, the pixels in the area surrounded by the vertices are filled. Furthermore, at this time, the drawing is started from the surface having the greatest depth value $z_0/w_0$ (furthest depth) and a closer surface is overwritten onto the surfaces already drawn (may be same as above method).

Modified Example of First Embodiment

An example of realizing the interpolation process of the vertex in drawing the exaggerated expression by a different variation, is described below.

Figure 12:
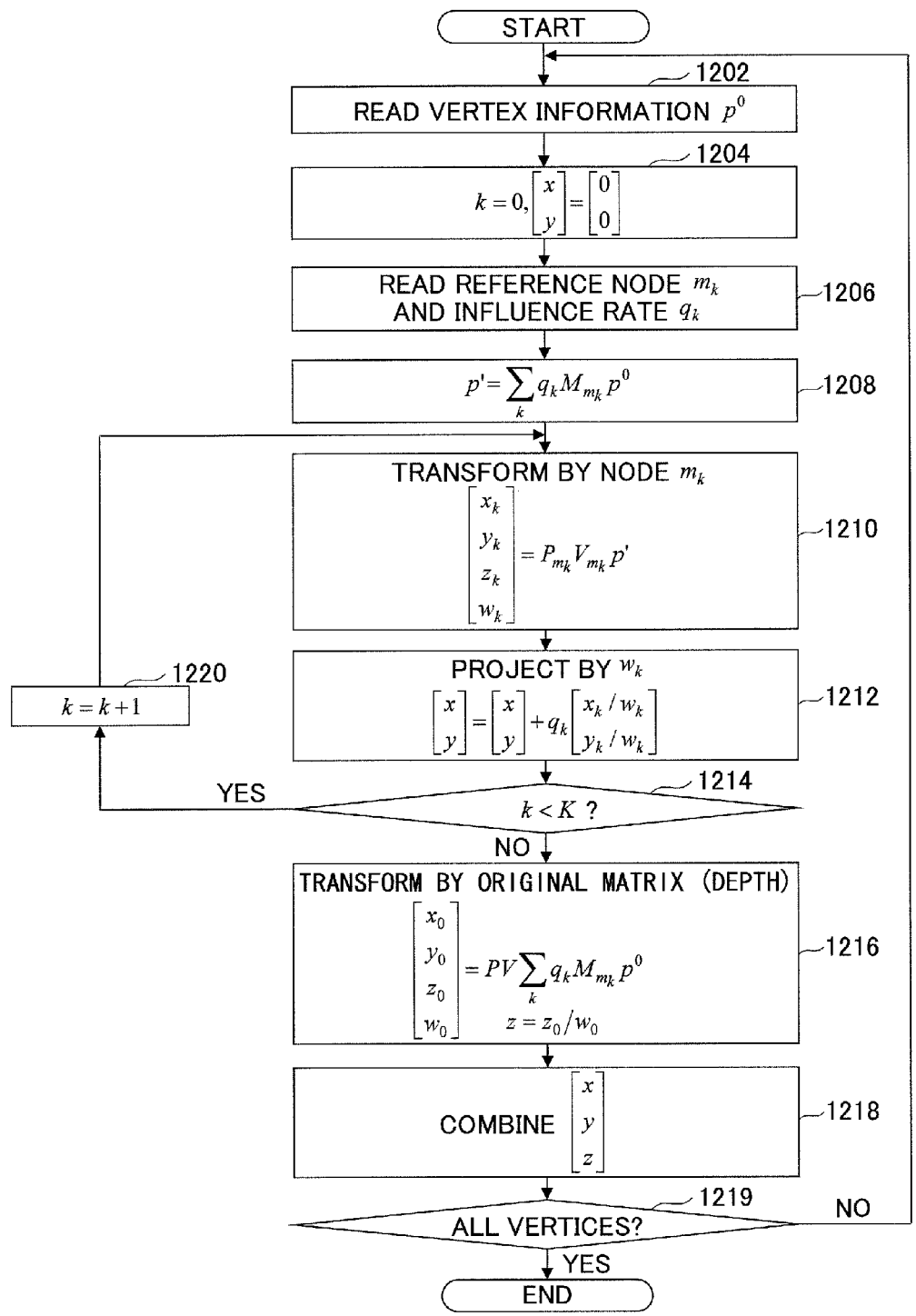
FIG. 12 illustrates a flow of transforming the vertex according to a modified example of the first embodiment.

FIG. 12 illustrates a flow of the transforming the vertex according to a modified example of the first embodiment.

The phase of "Step 406: Transformation of vertex" in the method of the first embodiment described above, the following calculation may be performed.

In step 1202, the position coordinate $p^0$ of the vertex of the polygon in the basic pose is read.

In step 1204, the parameters are initialized.

In step 1206, the list of bones $[m_0, m_1, m_2, \ldots, m_{K-1}]$ associated to each vertex of the polygon, and the influence rate $[(q_0, q_1, q_2, \ldots, q_{K-1}]$ on the vertex, are read.

In step 1208, for each node that influences the vertex $[m_0, m_1, m_2, \ldots, m_{K-1}]$, the coordinate position p', which has been interpolated in the same manner as regular skin mesh, is calculated by, for example, the following equation.

$$p' = \Sigma q_k M_{mk} p^0$$

In step 1210, by using this p', for each of $m_k$ (k=0, 1, . . . , K−1), coordinates in an exaggerated view volume to which a pseudo-viewpoint matrix and a pseudo-projection matrix are applied, is calculated by, for example, the following equation.

$$[x_k, y_k, z_k, w_k]^T = P_{mk} V_{mk} p'$$

In step 1212, the transformation result of this vertex is mapped on a point in the two-dimensional image by, for example, the following equation.

$$(\Sigma q_k(x_k/w_k), \Sigma q_k(y_k/w_k))$$

Steps are repeated K times by step 1214 and step 1220.

In step 1216, by the following equation, the depth value is calculated by a regular projection matrix, and $z_0/w_0$ is set as the perspective depth value.

$$[x_0, y_0, z_0, w_0]^T = PV \Sigma q_k M_{mk} p^0$$

In step 1218, the coordinates of the vertices of the polygon (x, y) and z are combined.

In step 1219, the above calculation is repeated for all vertices of the polygon.

That is to say, in the case of this modified example, the interpolation operation by the influence rate $q_k$ is performed two times by the modeling matrix, and the viewpoint matrix and the projection matrix.

Second Embodiment

[Resolving Nonconformity in Exaggeration]

In a second embodiment described below, it is possible to improve the defect that occurs by applying different projection matrices to the respective parts. In the basic technique, video images are created by different camera parameters for the respective joint regions. Therefore, inconsistencies arise in the positional relationship of the exaggerated part.

Figure 13A:
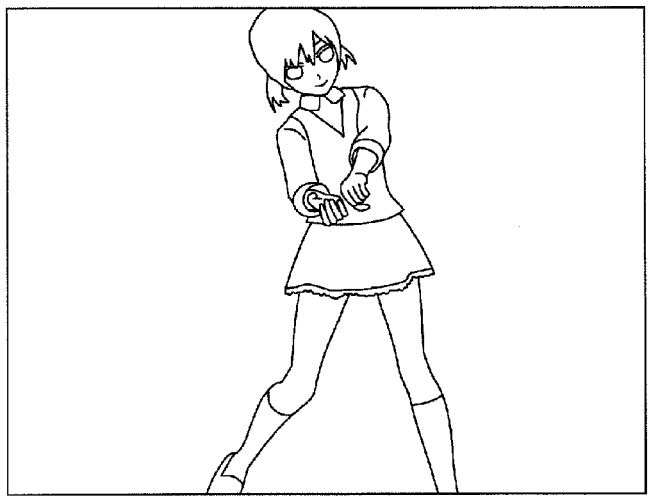
FIGS. 13A through 13C illustrate examples where overlapping occurs in the drawing.
Figure 13B:
Figure 13C:

FIGS. 13A through 13C illustrate examples where overlapping occurs in the drawing. An image without perspective exaggeration (FIG. 13A), and an image in which the drawings of the two hands are overlapping due to the perspective exaggeration process (FIG. 3B) are illustrated. As in the image without perspective exaggeration (FIG. 13A), when both hands are close together and stuck out forward, the hands are not supposed to overlap. However, in FIG. 13B, when objects (both hands) are exaggerated and enlarged, the hands appear to be overlapping. This is because the parameters of the cameras set for the right hand and the left hand are separately set, and therefore in the exaggerated image, the hands appear to be overlapping. FIG. 13C illustrates an example in which a process has been performed to avoid the overlapping.

The feeling that something is wrong in the image may be alleviated by moving the position of the camera to a three-dimensional weighted center point. In this case, the amount of moving the camera cannot be identified, and therefore the movement operation is to be repeated until the overlapping is avoided. Note that in this case, the visual size in the screen and the arrangement position are both controlled at the same time, and therefore it may not be possible to obtain appropriate camera parameters. Furthermore, the result changes due to the initial condition of recurrence. Thus, it may not always be possible to obtain the results that satisfy the restriction in the image. Furthermore, when this method is applied to animations, and the video images of frames are continuous in terms of time, the video images may not be continuous with each other, and unnatural video images may be produced (this point is described below in the third embodiment).

The second embodiment described below can resolve such a problem.

[Overview of Process]

In the second embodiment described below in detail, for example, a method of moving the pseudo-viewpoint position in a direction perpendicular to the sight line direction is used. Furthermore, the ratio of the movement amount of an image in the screen with respect to the movement amount of the pseudo-viewpoint position is calculated, and the movement distance of the pseudo-viewpoint in accordance with the overlapping of an object that has been tentatively arranged, is calculated.

[Configuration Elements]

FIGS. 14A and 14B illustrate an example of avoiding the overlapping that is caused by the enlargement of an image according to exaggerated drawing. An example of avoiding the overlapping of images is conceptually described with reference to FIGS. 14A and 14B. FIG. 14A illustrates a state where the drawings are overlapping, because exaggeration has been performed. A position $t_m$ of the first target point and the position $t_k$ of a second target point are displayed. It is assumed that for each target point, a collision radius is defined in advance. In FIG. 14A, a collision radius 1408 in a case where exaggeration is not performed, is illustrated. Other collision radii are similarly defined (not illustrated). Furthermore, a collision area 1404 and a collision area 1414 in a case where an exaggerated display is not performed, are illustrated. Furthermore, a collision area 1406 and a collision area 1416 in a case where an exaggerated display is performed, are illustrated, and these areas are drawn to be overlapping each other. The reason why these areas are drawn to be overlapping is that exaggeration has been performed for both points by using two different viewpoints (two cameras).

FIG. 14B illustrates an example where an operation has been performed to change the positions of two viewpoints, and shifting the position of the target point $t_m$ and the target point $t_k$ in the image by a vector 1450 and a vector 1460, respectively. Details of this operation are described below. According to this operation, the image 1406 moves to the image 1426, and the image 1416 moves to the image 1436. As a result, the exaggerated image 1426 and the exaggerated image 1436 are drawn so as not to collide with each other.

In the following, a description is given of a specific example of avoiding the overlapping of images.

In a scene, a 3D model constituted by vertex data is arranged. The vertex data is associated with particular nodes, and it is assumed that images are animated according to the changes in the arrangement of nodes.

Furthermore, it is assumed that the basic viewpoint position and direction of observing a scene are determined. A viewpoint matrix can be defined from this position and direction. Furthermore, the angle of view information of the video image is determined. A projection matrix can be defined from this angle of view. The information of the viewpoint position, direction, and angle of view is determined by a user according to input information, or may be determined by information that is stored in advance. The changes in the image according to the above changes are referred to as so-called camera animation.

The configuration of the node is defined as follows.
The information that is preferably stored in advance is as follows.
  Position $t^o{}_m$ of a target point in a basic pose
  Position $j^o{}_m$ of a joint point in a basic pose
  Collision radius $r_m$
  Exaggeration coefficient $\eta_m$
  Link n to parent node
The information that is dynamically determined is as follows.
  Position $t_m$ of present target point
  Position $j_m$ of present joint point
  Modeling matrix $M_m$
  Pseudo-viewpoint position $e_m$
  Pseudo-viewpoint matrix $V_m$
  Pseudo-projection matrix $P_m$
  Visual enlargement ratio $\rho_m(p)$ in exaggerated image with respect to point coordinate p
  Collision radius $r_m \rho_m(t_m)$ of target point in image
The configuration of the vertex is as follows.
  Position coordinate $p^o = [x,y,z,1]^T$ in basic pose
  Present position coordinate $p = M_m p^o$
  Link m to node

[Drawing Process Flow]

An example of the overall drawing process flow is described below.

[Overall Flow]

The overall process flow described above is substantially the same as the other embodiments. Note that, as described below, it is preferable to add major transformation to the method of calculating the arrangement of the pseudo-viewpoint position. The steps of FIG. 4 are used for the description.

[Step 402: Determination of Pose]

Based on the method described above, a modeling matrix $M_m$ is set for each node m. Furthermore, the present position $t_m = M_m t^0_m$ of the target point transformed by this modeling matrix, and the present position $j_m = M_m j^0_m$ of the joint point, are respectively calculated.

[Step 404: Arrangement of Camera]

In the second embodiment, it is preferable to provisionally set the projection center based on the camera arrangement method according to the method described above, and then subsequently correct the camera position.

Figure 15:
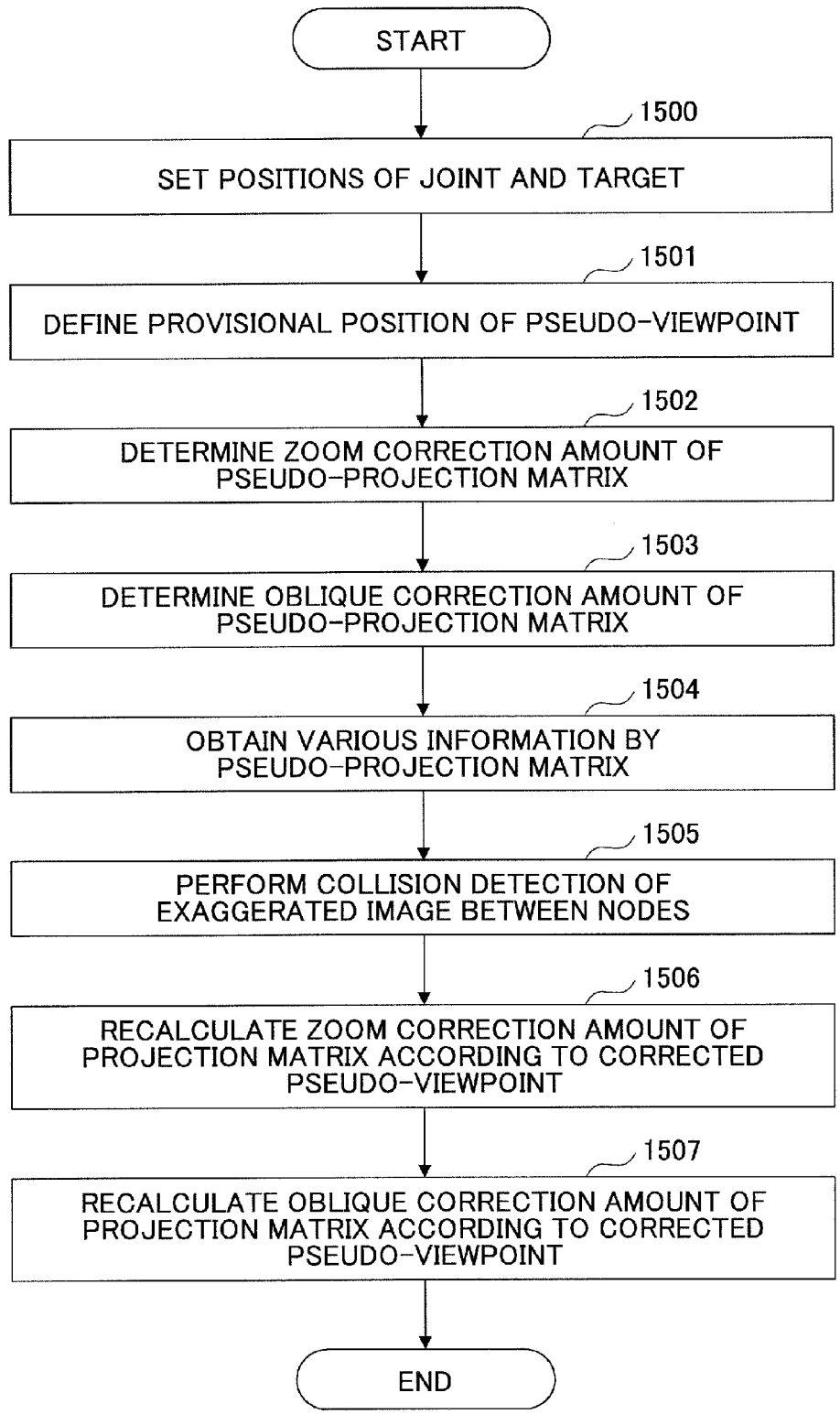
FIG. 15 illustrates an example of a flow for avoiding overlapping.

The $P_m V_m$ satisfying the above restriction conditions can be created by the procedures illustrated in FIG. 15.

In step 1500, the positions of the joints and targets are set.

The direction and the position of the segment are defined according to the rotational angle information $R_m$ of each joint m that has been read, and the pose of the character is determined. These information items are applied to the basic method described above, to create a matrix $M_m$ for performing transformation on each segment m.

In step 1501, the provisional position of the pseudo-viewpoint is defined. On a line joining the pseudo-viewpoint position $e_n$ of the parent layer and the target point position $t_m$ of itself, the pseudo-viewpoint position $e_m$ is set by using the following equation.

$$e_m = (e_n + \eta_m t_m)/(1 + \eta_m)$$

In the present embodiment, as $\eta_m$, a constant parameter stored in the node structure body in advance, is preferably read and used.

A pseudo-viewpoint matrix $V_m$ is created from the pseudo-viewpoint position $e_m$ and the camera direction. The direction of the pseudo-camera is preferably the same direction as the basic camera (a camera that is not a pseudo-camera).

In step 1502, the zoom correction amount of the pseudo-projection matrix is determined. The angle of view of the pseudo-projection matrix is corrected, such that in a plane $z = V_n j_m \cdot z$ (in the coordinate system of viewpoint $e_n$) including the joint point $j_m$, the scale of the image mapped by the pseudo-projection matrix of the parent layer (size of projected image), and the scale of the image mapped by the pseudo-projection matrix of this node (size of projected image), substantially match each other.

It is assumed that the pseudo-projection matrix $P_n$ of the parent node is already determined as follows.

[Equation 13]

$$P_n = \begin{bmatrix} p_{n00} & 0 & p_{n02} & 0 \\ 0 & p_{n11} & p_{n12} & 0 \\ 0 & 0 & p_{n22} & p_{n23} \\ 0 & 0 & 1 & 0 \end{bmatrix} \quad (13)$$

Based on the above, the projection matrix $P_m$ of the node m is obtained. The components of $P_m$ are as follows.

[Equation 14]

$$P_m = \begin{bmatrix} p_{m00} & 0 & p_{m02} & 0 \\ 0 & p_{m11} & p_{m12} & 0 \\ 0 & 0 & p_{m22} & p_{m23} \\ 0 & 0 & 1 & 0 \end{bmatrix} \quad (14)$$

First, a pseudo-projection matrix $P'_m$ in which only the angle of view is corrected, is created as follows.

[Equation 15]

$$P'_m = \begin{bmatrix} p_{n00} \dfrac{V_m j_m \cdot z}{V_n j_m \cdot z} & 0 & 0 & 0 \\ 0 & p_{n11} \dfrac{V_m j_m \cdot z}{V_n j_m \cdot z} & 0 & 0 \\ 0 & 0 & p_{n22} & p_{n23} \\ 0 & 0 & 1 & 0 \end{bmatrix} \quad (15)$$

In step 1503, the oblique correction amount of the pseudo-projection matrix is determined. That is, the oblique correction amount of the pseudo-projection matrix is corrected, and the shift amount is set such that in a plane $z = V_n j_m \cdot z$ (in the coordinate system of viewpoint $e_n$) including the joint point $j_m$, the image mapped by the pseudo-projection matrix of the parent node, and the image mapped by the pseudo-projection matrix of this node, match each other.

With respect to the pseudo-projection matrix $P'_m$ before setting the shift amount, the (0,2) and (1,2) components are corrected as follows, and this is determined as $P_m$.

[Equation 16]

$$P_{m02} = \dfrac{P_n V_n j_m \cdot x}{P_n V_n j_m \cdot w} - \dfrac{P'_m V_m j_m \cdot x}{P'_m V_m j_m \cdot w}$$

$$P_{m12} = \dfrac{P_n V_n j_m \cdot y}{P_n V_m j_m \cdot w} - \dfrac{P'_m V_m j_m \cdot y}{P'_m V_m j_m \cdot w} \quad (16)$$

In step 1504, various information items at the pseudo-projection matrix are obtained. In order to consider whether the images do not collide with each other, the following value is calculated for the pseudo-projection matrix of each node.

(1504-1) The two-dimensional image position of the target point is calculated. The coordinates (x, y) on the screen mapped by the pseudo-projection process $P_m V_m$ are $-1 < x < 1$, $-1 < y < 1$. The vertical-horizontal ratio of the screen with respect to this value is adjusted to obtain a two-dimensional coordinate value of $-1 < x < 1$, $-S_a < y < S_a$, and this two-dimensional value is to be referred to as a two-dimensional image. Here, $S_a$ is the vertical-horizontal ratio (vertical size/horizontal size) of the screen.

The two-dimensional image of the target point $t_m$ is set as $t'_m$. $t'_m$ is obtained by the following equation.

$$t'_m \cdot x = P_m V_m t_m \cdot x / P_m V_m t_m \cdot w$$

$$t'_m \cdot y = [P_m V_m t_m \cdot y / P_m V_m t_m \cdot w] S_a$$

(1504-2) The size of the two-dimensional image around the target point is calculated. The radius of the two-dimensional image of the minute three-dimensional sphere (where radius $\delta$, $\delta \ll 1$) centering around the target point is set to be $\rho_m(t_m)\delta$, and $\rho_m(t_m)$ is calculated. The movement amount of the two-dimensional image when the target point is moved by $\delta$ in the x direction of the viewpoint coordinate system may be used for approximation.

$$\rho_m(t_m) = [P_m(V_m t_m + [\delta, 0, 0, 0]^T) \cdot x / P_m(V_m t_m + [\delta, 0, 0, 0]^T) \cdot w - P_m V_m t_m \cdot x / P_m V_m t_m \cdot w] / \delta$$

$$= P_m[\delta, 0, 0, 0]^T \cdot x / P_m V_m t_m \cdot w / \delta$$

$$= p_{m00} / P_m V_m t_m \cdot w$$

This $\rho_m(t_m)$ is referred to as the enlargement ratio of the two-dimensional image around the target point.

(1504-3) The movement ratio of the two-dimensional image with respect to the movement of the pseudo-viewpoint position, is obtained. The amount that the target point moves in the image in a case where the pseudo-viewpoint position $e_m$ has moved in the x direction of the $e_m$ viewpoint coordinate system by a minute amount $(\delta,0,0)$ is calculated. The amount that the two-dimensional image of the joint point moves when the joint point $j_m$ has moved by a minute amount of $(\delta,0,0)$ while the projection matrix $P_m$ is fixed, can be expressed as $\rho_m(j_m)\delta$, by using the enlargement ratio $\rho_m(t_m)$ of the two-dimensional image around the joint point. Therefore, also when the viewpoint position has moved by $(-\delta,0,0)$, the joint point moves by $\rho_m(j_m)\delta$.

In the pseudo-projection matrix, by adjusting the amount of oblique correction, the position of the joint point in the image is maintained at a constant position. When this oblique correction is performed, the target point moves by the following amount.

$$[V_m(j_m-t_m)\cdot z/V_m(j_m-e_m)\cdot z]\rho_m(j_m)\delta$$

Therefore, when the pseudo-viewpoint position $e_m$ moves in the x direction of the viewpoint coordinate system by a minute amount $(\delta,0,0)$, the target point moves in the image by the following amount.

$$S(t_m)\delta = -\rho_m(j_m)[V_m(j_m-t_m)\cdot z/V_m(j_m-e_m)\cdot z]\delta$$

This $$S(t_m) = -\rho_m(j_m)[V_m(j_m-t_m)\cdot z/V_m(j_m-e_m)\cdot z]$$

is preferably stored as the movement ratio of the two-dimensional image of the target point with respect to the movement of the pseudo-viewpoint position.

Figure 16:
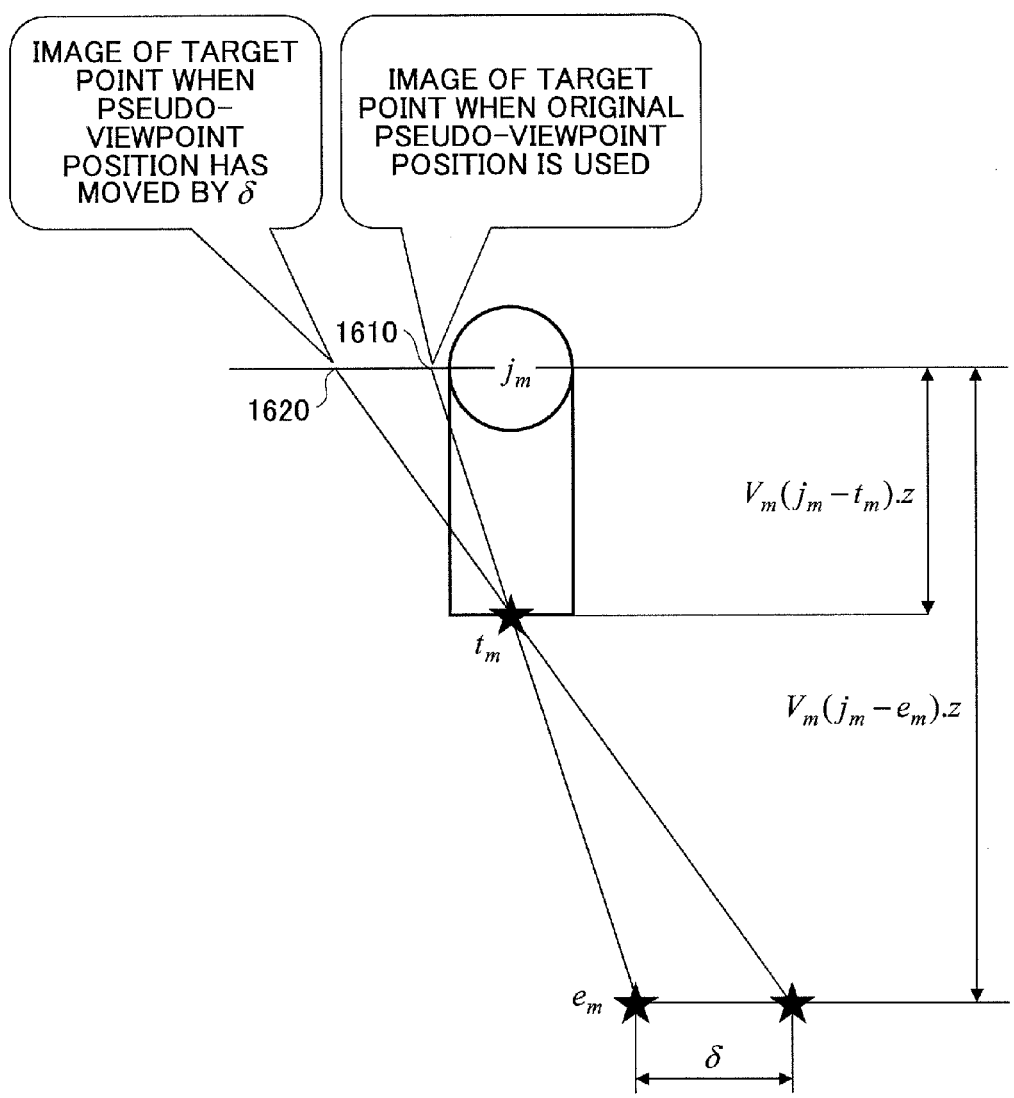
FIG. 16 illustrates the movement of the target point by the movement of a two-dimensional image at the pseudo-viewpoint position.

FIG. 16 illustrates the movement of the target point by the movement of the pseudo-viewpoint position.

A point 1610 indicates the position of the image of the target point in a case where the original pseudo-viewpoint position is used.

Furthermore, a point 1620 indicates the position of the image of the target point in a case where the pseudo-viewpoint has moved by $\delta$.

Referring back to FIG. 15, in step 1505, a collision detection between nodes of the exaggerated image is performed. With respect to the pairs of combinations of all nodes in the exaggerated image, it is detected whether collision has occurred in the exaggerated image. The pseudo-viewpoint position before correction is expressed as $e'_m$, and details are described below.

(1501-1) It is detected whether collision has occurred in the XY direction. This determination may be performed as follows.

A pair of two segments is selected. The respective node numbers are set as m, k. With respect to the two-dimensional images $t'_m$, $t'_k$ of the target points of these segments, the distance in a two-dimensional plane is checked.

$$d_0 = ((t'_m \cdot x - t'_k \cdot x)^2 + (t'_m \cdot y - t'_k \cdot y)^2)^{1/2}$$

Furthermore, the sizes of the collision radius of each node in the two-dimensional plane is $\rho_m(t_m)r_m$, $\rho_k(t_k)r_k$, where the collision radius of each of the target points is $r_m$, $r_k$, respectively. The sum is expressed as follows.

$$d_1 = \rho_m(t_m)r_m + \rho_k(t_k)r_k$$

When $d_0 < d_1$ is satisfied, that is, when the sum of the sizes in a two-dimensional plane is larger than the distance in a two-dimensional plane, it may be regarded that a collision has occurred in a two-dimensional plane. Furthermore, the process proceeds to the next step (1505-2).

(1505-2) It is detected whether there is a collision within a collision range in the z direction. The difference in the depth direction of the node is set as $d_2 = |V_m t_m \cdot z - V_m t_k \cdot z|$.

When $d_2 < r_m + r_k$ is satisfied, that is, when the difference in the depth is smaller than the sum of the collision radii, it is regarded that a collision may occur in the depth direction, and the process proceeds to (1505-3).

(1505-3) The avoidance amount of a collision is calculated. The amounts that the respective two-dimensional images are to be moved in order to avoid a collision are calculated. The movement amount in the two-dimensional image necessary for avoiding a collision can be calculated as $d_1 - d_0$ by the variables in the above step (1505-1).

A weight may be set in advance for each node, and this weight may be used to distribute the movement amount. The weights of the nodes m, k are set as $\alpha_m$, $\alpha_k$, respectively. The movement amount of the target point $t_m$ in a two-dimensional image may be obtained by multiplying the necessary movement distance by $\alpha_m/(\alpha_m + \alpha_k)$.

The movement direction of the target point $t_m$ in a two-dimensional image (two-dimensional vector in unit length) is expressed as follows.

$$\tau_{0m} = (t'_m - t'_k)/|t'_m - t'_k|$$

This is multiplied by the movement amount, and the movement amount of the target point $t_m$, in the two-dimensional image (two-dimensional vector) is obtained as follows.

$$\tau_{1m} = (d_1 - d_0)(\alpha_m/(\alpha_m + \alpha_k))\tau_{0m}$$

The correction amount (in the viewpoint coordinate system) of the pseudo-viewpoint position realizing the movement amount $\tau_{1m}$ in the image, is set as $\mu_m$, and this can be obtained by the following equation.

$$\mu_m \cdot xy = [\tau_{1m}/S(t_m)] \cdot xy$$

$$\mu_m \cdot zw = (0,0)$$

(1505-4) The pseudo-viewpoint position is corrected. The final pseudo-viewpoint position after correction becomes $e_m$, which satisfies the following equation.

$$V_m e_m = V_m e'_m + \mu_m$$

The obtained $e_m$ is used to recreate $V_m$. By performing this correction, it is possible to prevent objects around the target point of each segment from overlapping each other in an unnatural way.

In step 1506, the zoom correction amount of the projection matrix is recalculated, in accordance with the corrected pseudo-viewpoint. In step 1507, the oblique correction amount of the projection matrix is recalculated according to the corrected pseudo-viewpoint. Correcting the pseudo-viewpoint position as described above means to correct the parameters for drawing.

[Step 406: Transformation of Vertex]

Referring back to FIG. 4, the transformation of the vertex is performed in step 406. A node m corresponding to each vertex of a model (the position coordinate in the basic pose is $p^0$) is searched, and the pseudo-viewpoint matrix and the pseudo-projection matrix of the node are used to calculate the position in the view volume in the exaggerated expression.

$$[x,y,z,w]^T = P_m V_m M_m p^0$$

The vertex is finally applied on a point (x/w,y/w) in the two-dimensional image.

Furthermore, the regular viewpoint matrix of the basic camera and a projection matrix are used, to calculate the value $[x_0,y_0,z_0,w_0]^T = PVM_m p^0$ of the position in a regular view volume (coordinate value obtained by projection transformation by using a basic camera), and $z_0/w_0$ is set as the perspective depth value.

[Step 408: Filling Pixels]

The pixels in the two-dimensional image are filled (a rasterizing process is performed).

In this filling in process, the color of the triangle in the front finally needs to be visible, and therefore the drawing order is important. In order to follow this depth order, the depth value $z_0/w_0$ obtained by transformation of the vertex is used to sort the surfaces, and the furthest surface is drawn first, and closer surfaces are drawn by overwriting the drawn surfaces.

In the process of avoiding the overlapping of objects by the method according to the second embodiment described above, the camera may not be moved in the depth direction (z direction in viewpoint coordinate system), and the camera may be moved in a direction parallel to the projection plane (xy plane in viewpoint coordinate system). Furthermore, in this case, for example, the ratio of the amount of moving the pseudo-viewpoint position in a direction parallel to the projection plane, and the amount that the object appears to be moving in the image, is calculated in advance. This ratio is used to move the pseudo-viewpoint position by an amount that is necessary for avoiding the overlapping of objects in the screen.

Other Modified Examples

Other than the method according to the second embodiment described above, the two pseudo-viewpoint positions $e_m$, $e_k$ may be respectively moved in the direction of the three-dimensional weighted center $(e_m+e_k)/2$ when segments collide. Note that in this case, since the movement amount is not determined, the positions are preferably repeatedly moved by a minute amount until the problem is solved.

Third Embodiment

[Smoothing Process of Animation]

When the method of exaggerated drawing described in the second embodiment is used for an animation, there are cases where the posture rapidly moves in part of the frames of the animation. This is caused an adjustment effect of a correction process is added, only when visual overlapping has occurred.

In this case, by implementing the following procedures, it is possible to further smoothly avoid the overlapping of objects in an animation.

In the following description of the third embodiment, mainly the parts that are different from the second embodiment are described, in order to avoid redundancy.

[Overview of Process]

In each frame f of the animation, the provisional position $e'_m(f)$ of the pseudo-viewpoint is defined. At this time, in the middle of the animation, there are cases where a process is performed to correct the display position, because objects have collided or have come in close contact. For example, a frame $f_c$ in which such a correction is to be made is detected in advance, and the correction amounts of frames before and after this frame $f_c+1$, $f_c-1$ are set to be close to the correction amount of the frame $f_c$. When this correction process is repeated N times, the correction amount is propagated and smoothing can be performed.

[Configuration Elements]

The information of the viewpoint position, direction, and angle of view is determined by a user according to input information, or may be determined by information that is stored in advance. The changes in the image according to the above changes are referred to as so-called camera animation. In camera animation, a viewpoint matrix V and a projection matrix P are both functions of frame f.

Furthermore, the animation according to changes in the pose of the character is referred to as pose animation. In the pose animation, a modeling matrix $M_m$ is the function of the frame f.

The configuration of the node is defined as follows.
The information that is preferably stored in advance is as follows.

Position $t^0_m$ of a target point in a basic pose
Position $j^0_m$ of a joint point in a basic pose
Collision radius $r_m$
Exaggeration coefficient $\eta_m$
Link n to parent node The information that is dynamically determined is as follows.

Position $t_m = M_m(f) t^0_m$ of present target point
Position $j_m = M_m(f) j^0_m$ of present joint point
Modeling matrix $M_m(f)$
Pseudo-viewpoint position $e_m(f)$
Pseudo-viewpoint matrix $V_m(f)$
Pseudo-projection matrix $P_m(f)$
Data of pseudo-viewpoint distance proportional to number of time frames The configuration of the vertex is as follows.
Position coordinate $p^0 = [x,y,z,1]^T$ in basic pose
Present position coordinate $p = M_m(f) p^0$

[Drawing Process Flow]

An example of the overall drawing process flow is described below.

[Overall Flow]

The overall process flow of the present embodiment is substantially the same as the other embodiments. However, parameters corresponding to the number of frames according to the animation time are generated, and the influence to each other is preferably considered. Furthermore, as described below, a calculation of propagating the correction of the pseudo-viewpoint position is preferably implemented. Similar to the other embodiments, FIG. 4 is used for describing the flow of the process.

[Step 402: Determination of Pose]

A modeling matrix $M_m$ is set for all of the nodes m in each frame. Furthermore, the position $t_m(f) = M_m(f) t^0_m$ of the target point transformed by this modeling matrix, and the position $j_m(f) = M_m(f) j^0_m$ of the joint point, are both calculated.

[Step 404: Arrangement of Camera]

The arrangement of the camera may be determined, for example, based on the process according to the second embodiment, by performing the following process flow.

However, in the processing procedures of steps 1500 through 1504 of the second embodiment, a value according to the frame f is calculated and stored. Furthermore, in the "collision detection between nodes of the exaggerated image" of step 1505, the following processes of 1505-a1 through 1505-a4 are performed for the smoothing process between frames.

FIG. 17 illustrates a process flow for smoothing the animation. In the following, with reference to FIGS. 15 and 17, the parts that are different from those of the second embodiment are described.

(1505-a1)

For all frames, the detailed process of 1505-a1 described below is performed, and a correction amount $\mu_n(f)$ is set (f is the frame number, n is the node number).

(1505-a1-0) Assignment of Initial Value of Correction Amount

In step 1702, the initial value is assigned. That is, the following is performed.

$$\mu_n(f) \cdot xy = (0,0)$$

(1505-a1-1) Setting Correction Amount

In step 1704 through step 1712, for combinations of all nodes (k, m), the following processes of 1505-a1-1-1 through 1505-a1-1-2 are performed.

(1505-a1-1-1) Collision Detection

In step 1704, a pair of nodes is selected. Then, in step 1706, it is detected whether a collision has occurred in the xy direction in frame f. Furthermore, it is detected whether there is a collision within a collision range in the z direction (step 1708). When there is a collision, in 1505-a1-1-2, $\mu_m(f)$, $\mu_k(f)$ are set.

(1505-a1-1-2) Calculate Correction Amount

The correction amount $\mu_m(f)$ of the pseudo-viewpoint position (in the viewpoint coordinate system) for avoiding a collision in the frame f, is calculated. The same calculation is also performed for $\mu_k(f)$ (step 1710).

$$\tau_{0m} = (t'_m - t'_k)/|t'_m - t'_k|$$

$$\tau_{1m} = (d_1 - d_0)(\alpha_m/(\alpha_m + \alpha_k))\tau_{0m}$$

$$\mu_m(f) \cdot xy = [\tau_{1m}/S(t_m)] \cdot xy$$

$$\mu_m(f) \cdot zw = (0,0)$$

(1505-a2) Smooth Correction Amount Between Frames

In step 1714, an adjacent node is selected. Then, in step 1716, a smoothing process of the correction amount $\mu_n(f)$ is performed between frames. For each frame f, the following processes of 1505-a2-1 and 1505-a2-2 are performed.

(1505-A2-1) Smooth Correction Amount

For all nodes, the correction amount $\mu_m(f)$ of the frame f is smoothed by the following equation (m is the node number).

$$\mu_m(f) \cdot xy \leftarrow \mu_m(f) \cdot xy + \sigma(\mu_m(f+1) \cdot xy - \mu_m(f) \cdot xy) + \sigma(\mu_m(f-1) \cdot xy - \mu_m(f) \cdot xy)$$

This equation has the function of bringing the value of $\mu_m(f) \cdot xy$ close to $\mu_m(f-1) \cdot xy$ and $\mu_m(f+1) \cdot xy$. As the value of σ, for example, 0.5 may be used. The present invention is not limited to this value. By this smoothing process, there may be cases where the correction amount set at 1505-a1-1 decreases; however, by repeating 1505-a4 below, a correction is performed again.

(1505-A2-2) Detect Collision Again

In step 1718, for combinations of all nodes (k, m), the routine process of 1505-a1-1-1 is used to detect whether a collision has occurred again in the image of frame f (step 1722). When there is a collision, the smoothing of the correction amount of frame f may be cancelled (step 1720). Then, the process proceeds to the next frame.

(1505-A3) Correct Pseudo-Viewpoint Position

Based on the correction amount $\mu_m(f)$, the following equation is used to correct the pseudo-viewpoint position.

$$V_m(f)e_m(f) = V_m(f)e'_m(f) + \mu_m(f)$$

The above processes are performed for all adjacent nodes (step 1724).

(1505-A4) Repetition of Correction

In step 1726, the processes of the above described 1505-a1 through 1505-a3 are repeated for a total of N times.

By the above process, the movement amount of the camera position is determined (step 1728).

[Step 406: Transformation of Vertex]

For each frame f, transformation of the vertex is performed.

A node m corresponding to each vertex of a model (the position coordinate in the basic pose is) $p^0$) is searched, and the pseudo-viewpoint matrix and the pseudo-projection matrix of the node are used to calculate the position in the view volume in the exaggerated expression.

$$[x,y,z,w]^T = P_m(f)V_m(f)M_m(f)p^0$$

Finally, in the two-dimensional image, similar to other embodiments, the position of the vertex in a regular view volume (coordinate value obtained by projection transformation by using a basic camera) may be obtained by using the regular viewpoint matrix of the basic camera and a projection matrix. That is, the value of $$[x_0, y_0, z_0, w_0]^T = P(f)V(f)M_m(f)p^0$$

is calculated, and $z_0/w_0$ is set as the perspective depth value.

[Step 408: Filling Pixels]

In each frame f, the pixels in the two-dimensional image are filled (a rasterizing process may be performed). In this filling in process, the color of the triangle in the front finally needs to be visible, and therefore the drawing order is important. In order to follow this depth order, it is preferable that the depth value $z_0/w_0$ obtained by transformation of the vertex is used to sort the surfaces, and the furthest surface is drawn first, and closer surfaces are drawn by overwriting the drawn surfaces.

Fourth Embodiment

[Setting Exaggeration Coefficient Parameter]

In the above embodiments, a parameter (exaggeration coefficient) for controlling the position of the camera is preferably set in advance, with respect to each of the joint regions. Note that when a similar model has already been created, it is expected to enhance the efficiency in the operation by using the same value or substantially the same value as the exaggeration coefficient. However, when a new model is created, it is assumed that there are cases that it is difficult to use the same parameters due to the following reasons.

(1) The joint regions may not correspond to each other in a one-to-one manner in all of the models. For example, there is a model for which bones are set for regions of clothing such as a skirt, long hair, etc. to enable to define the pose. In this case, when an exaggeration coefficient is defined for each region, it takes a lot of effort to adjust.

(2) When a model of a human object having a different build is created, it may be necessary to set new appropriate parameters.

In the fourth embodiment described below, even for a new model for which exaggeration coefficients are not defined, by selecting a basic shape type, the parameters of the exaggeration coefficients can be analogized and set.

[Overview of Process]

A model (standard envelope) having a standard shape is used. It is assumed that for a particular model, appropriate exaggeration coefficients are already set. By adjusting the pose or the sizes of the regions of the standard envelope (or model), it is possible to make the joint positions of the model and the corresponding joint positions of the standard envelope substantially match each other. In this state, for example, with respect to each vertex of the standard envelope, a value of the exaggeration coefficient associated with the closest target point is stored as the exaggeration coefficient of the vertex.

The standard envelope whose values of exaggeration coefficients have been stored, is stored in a database, and when creating a new model, the information of the standard envelope can be called and used.

For example, with respect to each target point of a new model, the closest vertex in the standard envelope is searched, and the value of the exaggeration coefficient of the search-found vertex is set as the exaggeration coefficient of the target point.

A plurality of standard envelopes can be prepared according to the type of character (build, etc.).

The following are examples of configuration elements.
Model shape
Joint structure
Standard envelope model The following are examples of vertex data of the standard envelope model.
Position of vertex
Exaggeration coefficient

[Overall Flow]

The overall flow is largely divided into processes of copying an exaggeration coefficient from a model to which exaggeration coefficients have already been assigned, to an envelope, and processes of copying exaggeration coefficients from an envelope to a model to which exaggeration coefficients are not assigned.

Figure 18A:
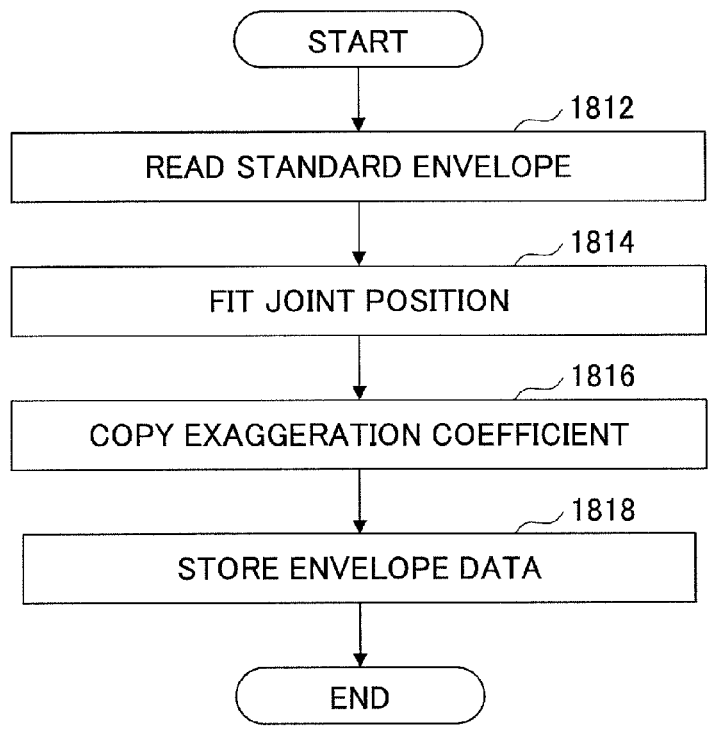
FIGS. 18A and 18B illustrate flows of setting exaggeration parameters to the regions of a model.
Figure 18B:
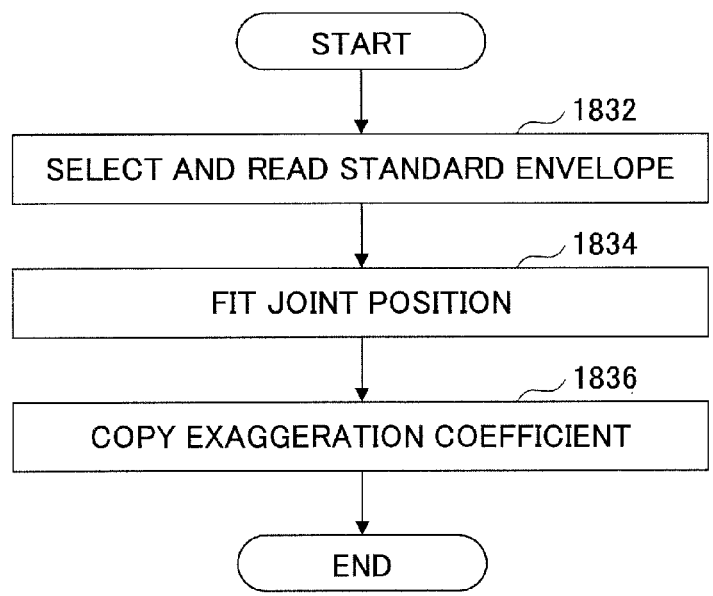

FIGS. 18A and 18B illustrate flows of setting exaggeration parameters to the regions of a model. FIG. 18A illustrates an example of a flow of the stage of creating a standard envelope. FIG. 18B illustrates an example of a flow of copying an exaggeration coefficient to a new model. In the following, details of the fourth embodiment are described.

[A. Envelope Creating Stage]

Figure 19:
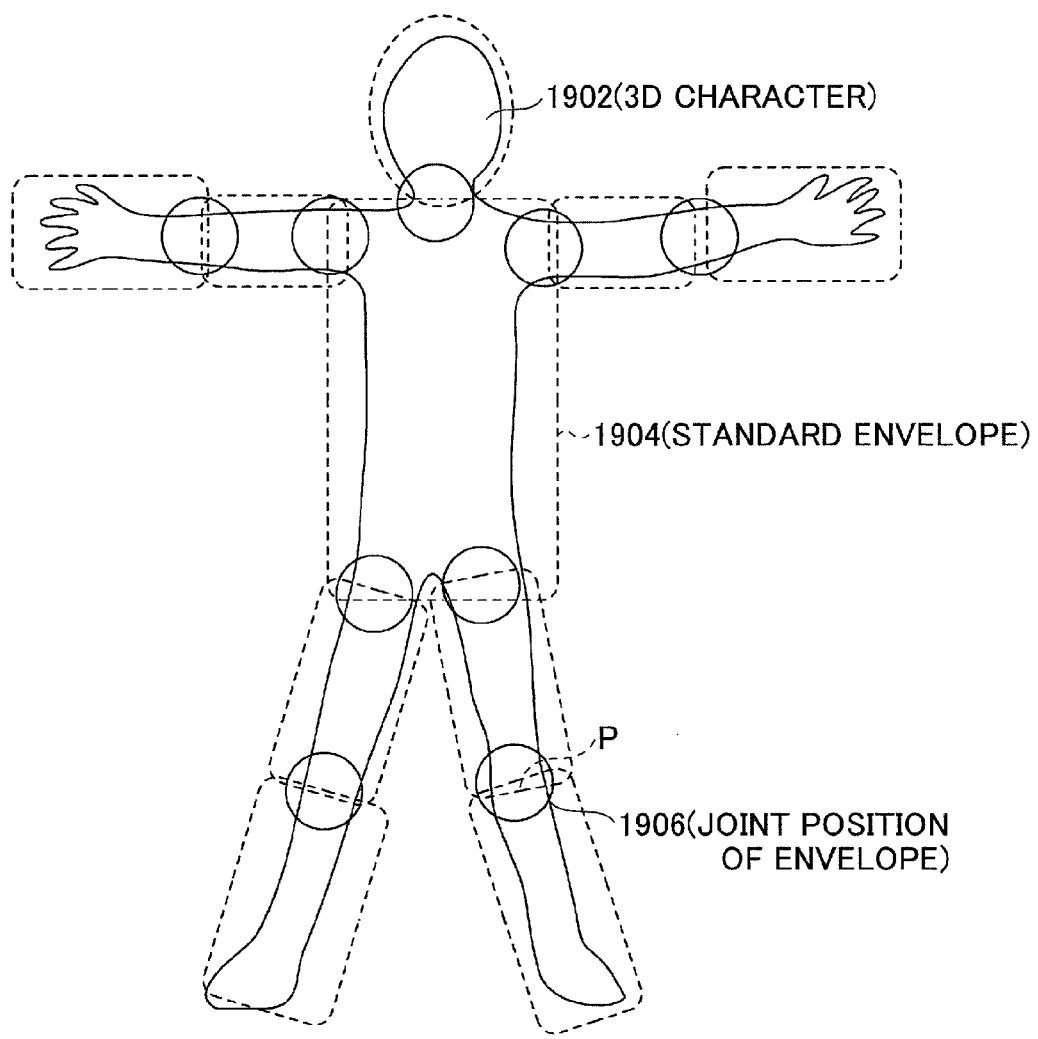
FIG. 19 illustrates envelopes overlapping a 3D model.

FIG. 19 illustrates envelopes overlapping a 3D character. In a 3D character 1902, it is assumed that exaggeration coefficients have already been set.

In step 1812, a standard envelope 1904, which is a model of a simple shape expressing the standard shape of a human being, is read. This standard envelope 1904 is constituted by a plurality of vertices; however, the standard envelope 1904 may have a more coarse form (less number of vertices) than the 3D character 1902.

In step 1814, the positions of the joint points are fit. Specifically, a process may be performed such that the positions of a joint point of the 3D character 1902 and a joint point of the standard envelope 1904 (for example, the joint position 1906 of the envelope) substantially match each other. When a joint point having the same name as a joint point of the standard envelope 1904 is set in the 3D character 1902, the position of the joint point of the standard envelope 1904 may be moved to the position of the joint point of the 3D character 1902. When the correspondence relationship of the joints is erroneous, or when there is no appropriate joint, the operator may be prompted to move the position of the joint point.

A vertex p of the standard envelope 1904 is moved in accordance with a position 1906 of the joint point by the following procedures. First, the positions $(j_0, j_1, j_2, \ldots, j_{K-1})$ of the joint points of the 3D character near the vertex P of the standard envelope 1904 are extracted, and the distances $(d_0, d_1, d_2, \ldots, d_{K-1})$ from the vertex P to the positions of the joint points are calculated. The movement amount v of the vertex P may be determined as follows, by interpolating the movement amounts $(v_0, v_1, v_2, \ldots, v_{K-1})$ of these joint points.

[Equation 17]

$$v = \frac{\sum_k v_k / d_k}{\sum_k 1 / d_k} \qquad (17)$$

In step 1816, the exaggeration coefficient is copied. With respect to each vertex p of the envelope, the top N number of target points near each vertex p are searched for. The target points near the vertex p are set as $(t_0, t_1, t_2, \ldots, t_{N-1})$, and the distances $(d_0, d_1, d_2, \ldots, d_{N-1})$ from p to the target points are calculated.

The exaggeration coefficient η may be determined as follows, by interpolating the exaggeration coefficients $(\eta_0, \eta_1, \eta_2, \ldots, \eta_{N-1})$ of the target points.

[Equation 18]

$$\eta = \frac{\sum_k \eta_k / d_k}{\sum_k 1 / d_k} \qquad (18)$$

In step 1818, the envelope data is stored. The joint positions may be changed, and the information of each vertex of the envelope (exaggeration coefficient, 3D information, distance from target point to vertex) may be stored in the database. Furthermore, at this time, the image of the 3D character that is the copy source, the name of the creator, or text information describing the purpose of the setting concept may also be stored together.

Generally, there is not always an optimum value as to how to set the degree of exaggeration, and there are variations depending on the type of model (male character/female character/robot/stuffed animal, etc.) or the personality of the author. Thus, as a concept of setting the exaggeration coefficient, for example, when the style of a particular animation company or a particular author is simulated, the name of author used as the model of simulation may be described as the text information as the intention of the setting concept.

[B. Copy Exaggeration Coefficient to New Model]

An exaggeration coefficient can be copied to a model of a 3D character for which an exaggeration coefficient is not specified, by the following procedures.

In step 1832, the standard envelope that has been stored in step 1818 is called. When a plurality of standard envelopes are prepared, the appropriate envelope is selected according to the type (build, etc.) of the character. An example of a selection method is given. The existing standard envelope information stored in the database, and images of the 3D character used for creating the envelope are called from the database, and presented in a list on a screen. At this time, the models can be sorted in an order of closeness to the present model, starting from the model in which the ratios of distances between joints are closest to those of the present model. Furthermore, at this time, the name of the creator or text information describing the intention of the setting concept may also be displayed together.

The user specifies one model from this list, and calls the stored standard envelope. When there are a plurality of candidates, a mechanism of manually operating the influence rate of the interpolation data can be prepared. In the display screen, the source information of the model is described, and the setting concept of the exaggeration coefficient is stored. By using a manual input screen, it is possible to select an exaggeration parameter that suits the circumstances, from among a plurality of options.

Alternatively, by using a pattern recognition technology, matching with the character may be performed. A predetermined pattern recognition technology may be used to read the closest standard envelope. Alternatively, a plurality of types of standard envelopes close to the character may be extracted and displayed so as to be selected. The operator may be prompted to select one standard envelope from the plurality of types of envelopes.

In step 1834, the joint positions are fit. The joint positions of the standard envelope are moved to the joint positions of the 3D character. By using the above method, the joint positions of the envelope are moved to the corresponding joint positions of the model, and the movement amount v of the envelope vertex may be determined as follows, from the movement amounts $(v_0, v_1, v_2, \ldots, v_{K-1})$ of the joint points.

[Equation 19]

$$v = \frac{\sum_k v_k / d_k}{\sum_k 1 / d_k} \quad (19)$$

Based on this movement amount v, the vertex of the envelope may be moved.

In step 1836, the exaggeration coefficient is copied. With respect to the target point of the present 3D character, a top N number of vertices of the nearest standard envelope are searched for. The distances from these N number of vertices to the target point and the exaggeration coefficients of the vertices are set as $(d_0, d_1, d_2, \ldots, d_{N-1})$ and $(\eta_0, \eta_1, \eta_2, \ldots, \eta_{N-1})$, respectively. A new exaggeration coefficient $\eta$ may be determined as follows, by interpolating these N number of exaggeration coefficients. Here, $\eta_k$ on the right side is the exaggeration coefficient of the vertex of a standard envelope, and $\eta$ on the left side is an exaggeration coefficient that is stored in the target point of the new 3D model.

[Equation 20]

$$\eta = \frac{\sum_k \eta_k / d_k}{\sum_k 1 / d_k} \quad (20)$$

[Mixture of Plural Models]

Furthermore, there are cases where it is necessary to specify a plurality of models and read the models. For example, there is a case where the present model holds a bone of long hair, but there is no corresponding part in the envelope to be the copy source. In this case, it is assumed that there is a request to call an exaggeration coefficient from a different model and use the called exaggeration coefficient, only for this part. In this case, the following process may be performed.

In the process of "select and read envelope of step 1832", a plurality of (H) envelope data items, and the respective influence rates $q_0, q_1, q_2, \ldots, q_{H-1}$ are input.

In the process of "copy exaggeration coefficient of step 1836", the exaggeration coefficient may be calculated as follows.

[Equation 21]

$$\eta = \frac{\sum_h q_h \sum_k \eta_{h,k} / d_k}{H \sum_k 1 / d_k} \quad (21)$$

Here, $\eta_{h,k}$ on the right side is an exaggeration coefficient that is called from the envelope, and n on the left side is the exaggeration coefficient stored in the target point of the new 3D model. By this process, the data near the joint point is weighted by a higher value, which reduces the influence from a model that does not include a corresponding bone among the data referred to.

[Usage of Bone]

When a 3D character having a bone structure is handled, a method of using bones instead of envelopes may be performed. A standard bone model may be prepared instead of the standard envelope. An exaggeration coefficient may be stored for each bone of the standard bone model. When using a new character mode, a correspondence relationship may be applied to bones (plural-to-plural) of corresponding regions between the new character model and a standard bone model. Next, the exaggeration coefficients may be copied from the standard bone to the target points in the character.

Furthermore, by applying a mechanism for manually inputting a blend ratio, it is possible to perform simulation by blending the exaggerated style of the author.

Fifth Embodiment

[Dynamic Adjustment of Exaggeration Amount]

In the basic technique described above, the amount of exaggeration is automatically determined only by the position of the joint region. However, in reality, there are cases where the user wants to exaggerate the perspective of a region and cases where the user does not want to exaggerate the perspective of a region. For example, in a case where a hand is stuck out toward the viewpoint, a video image having impact can be created by exaggeration; however, when the hand is extended to a pen (an object that is not exaggerated) right in front of the body, it is better not to use an exaggerated expression of perspective such that the contradiction of size between the pen and the hand does not become significant.

Furthermore, with respect to an object extending toward the depth direction of the screen, there is a style of using exaggeration of perspective and a style of not using exaggeration of perspective. Furthermore, particularly when exaggerating in the depth direction of the screen, for example, at a location where the foot and the ground are in contact, a contradiction may occur.

The fifth embodiment indicates an example of realizing a function of automatically switching between using an exaggeration operation and not using an exaggeration operation, according to such statuses.

[Overview of Process]

In the fifth embodiment, it may be determined whether each node satisfies a particular meaning condition, and change the exaggeration coefficient according to the determination result. For example, the following three conditions may be used as determination standards.

(1) Determination of close contact of object: Whether the target point is in close contact with a particular object.
(2) Determination of direction: Whether the direction from the joint point to the target point is directed toward a particular object.
(3) Determination of pose: Whether joint structure of the model is similar to a pose defined in advance.

When there is a combination of nodes that satisfies any of these conditions, a subsidiary branch may be added in a control graph of the exaggeration amount. Then, the exaggeration coefficient may be propagated in the graph, to achieve a distance that satisfies the restriction condition. The distance used for controlling the exaggeration amount is referred to as a pseudo-viewpoint distance.

The pseudo-viewpoint distance is defined as a z direction component in a viewpoint coordinate system of a vector directed from a basic viewpoint position $e_0$ to a pseudo-viewpoint position $e_m$, and this is set as $e_{zm}$. When setting this pseudo-viewpoint distance, a point to be the comparison target of the exaggeration amount may be freely set, without being limited to the parent node. This point is referred to as a comparison generating point, and the ID of the node including the comparison generating point is expressed by b.

In the basic technique, the position of the pseudo-viewpoint is set by using an exaggeration coefficient expressing the ratio at the top stage node. In this embodiment, for example, the pseudo-viewpoint distance $e_{zm}=V_0(e_m-e_0)\cdot z$ is determined first, and the pseudo-viewpoint position is moved according to this value.

In the embodiment described below, the operation of adjusting the visual size of a particular area in which nonconformity is occurring, by controlling the distance between the camera and the subject, may be performed separately from the operation of adjusting the camera position along the screen plane.

[Configuration Elements]

Configuration of Node

The information that is preferably stored in advance is as follows.

Position $t^0_m$ of a target point in a basic pose
Position $j^0_m$ of a joint point in a basic pose
Collision radius $r_m$
Exaggeration distance coefficient $\psi_m$
Link $n_0$ to parent node
Link b to node including comparison generating point
Position $j^0_b$ of comparison generating point in basic pose The information that is dynamically determined is as follows.

Position $t_m$ of present target point
Position $j_m$ of present joint point
Position $j_b$ of present comparison generating point
Link to temporary connection node $[n_1, n_2, n_3, \ldots]$
Influence rate to temporary connection node $[q_1, q_2, q_3, \ldots]$
Pseudo-viewpoint position $e_m$
Pseudo-viewpoint matrix $V_m$
Pseudo-projection matrix $P_m$
Influence value of sight line direction $v_m$ The configuration of the vertex is as follows.
Position coordinate $p^0=[x,y,z,1]^T$ in basic pose
Present position $p=M_m p^0$ The pattern (pose c) of the pose (angle of joint) is as follows.
ID number of node $[m_0, m_1, m_2, \ldots, m_{K-1}]$
Angle of node (joint) $[R_0, R_1, R_2, \ldots, R_{K-1}]$
Exaggeration distance adjustment coefficient $\varphi_c$

[Drawing Process]
[Overall Flow]

In the present embodiment, when determining the pose, collision with an object in a 3D model is determined, the pattern of the motion, and meaning conditions such as the direction with respect to the sight line, are determined. For example, according to this value, the pseudo-viewpoint distance is changed. In the following, the process flow is described with reference again to FIG. 4. Note that in order to avoid overlapping descriptions, the changes unique to the present embodiment are mainly described.

[Step 402: Determination of Pose]

1-1 Setting Modeling Matrix

An object is arranged in a scene. A pose is set for each joint model. For each node m, data $R_m$ of a rotational angle is called, and based on the method based on forward kinematics described above, a modeling matrix $M_m$ is set for each node m.

1-2 Determination of Target Point and Joint Point

The present position $t_m=M_m t^0_m$ of the target point transformed by a modeling matrix, and the present position $j_m=M_m j^0_m$ of the joint point are calculated.

1-3 Connection Determination of Object

With respect to a combination $(m_0, m_1)$ of nodes in a scene, for example, connection determination is performed. In an example assumed to be a node $m_0$, $m_1$, $m_0$ is a body region (for example, a hand) and $m_1$ is an object (for example, a gun).

When the distance $|t_{m0}-t_{m1}|$ of the target point of the node is shorter than a collision distance $r_{m0}+r_{m1}$, it is regarded that there is contact (for example, a gun is held in the hand), and a node $m_1$ is registered in the temporary connection node list of the node $m_0$. Furthermore, in the temporary connection node list of the node $m_1$, it is preferable to register the node $m_0$.

At this time, for several special objects, for example, a value $\varphi_c$ may be registered in association with the object, and the exaggeration distance coefficient of the contacting node may be changed as $\varphi_m \leftarrow \varphi_m \varphi_c$. Accordingly, the exaggeration of the perspective when contacting the object can be further emphasized. For example, with respect to an object for which an impact is to be applied to the pose holding this object, such as a gun or a Japanese sword, it is effective to perform the above process.

1-4 Determination of Direction

A determination may be made as to whether the direction from a generating point $b_0$ to the target point $m_0$ is directed toward a particular object $m_1$. An assumed example is that the joint of a generating point node $b_0$ is the shoulder, the target of the node $m_0$ is the fingertip, and the target of the node $m_1$ is a treasure box. For example, when an angle formed by a direction $t_{m0}$-$j_{b0}$ (for example, a direction directed from the shoulder to the fingertip) and a direction $t_{m1}$-$j_{b0}$ (for example, a direction directed from the shoulder to the treasure box) is less than or equal to a threshold angle, it is regarded that the direction is directed toward a particular object (for example, indicating the treasure box). Then, the node $m_1$ is registered in the temporary connection node list of the node $m_0$. Furthermore, the node $m_0$ may be registered in the temporary connection node list of the node $m_1$.

At this time, with respect to several particular objects, for example, a value $\varphi_c$ may be registered in association with the objects, and the exaggeration distance coefficient may be changed as $\varphi_m \leftarrow \varphi_m \varphi_c$. Accordingly, when the direction of the body region is directed to a particular object, and a motion such as pointing the treasure box is performed, it is possible to emphasize the exaggeration of the perspective.

1-5 Determination of Pose

It may be determined as to whether the joint angles of a part of a model are near joint angles set in advance. For example, with respect to node joint information [$m_1$, $m_2$, $m_3$, ... ] of node joints of fingers and thumb, the joint angles [$R_1$, $R_2$, $R_3$, ... ] of a pose of a peace sign is registered in advance. When the joint angles are close to these angles, it may be determined that the pose is a peace sign.

When it is determined that the pose is a particular pose, for example, the exaggeration distance coefficient $\varphi_m$ of the node of the model is multiplied by a value $\varphi_c$ that has been registered in association with the pose, and adjustment is made as $\varphi_m \leftarrow \varphi_m \varphi_c$. For example, when impact is to be applied to a particular pose such as a peace sign or a first pump, it is effective to perform the above process.

1-6 Adjustment Due to Influence of Sight Line Direction

By using the sight line direction influence value $v$, it is possible to adjust the exaggeration distance coefficient $\varphi_m$. A generating point appropriate for expressing the characteristic direction of the node is set on the node. For example, when a target point of a node corresponding to the forearm is set at the position of the wrist, the generating point is set near the elbow. This expresses that the direction directed from the generating point to the target point, is the direction in which the forearm is directed.

For example, an angle $\theta$ formed by a direction $t_m$-$j_b$ directed from the generating point to the target point, and the direction $e_0$-$j_b$ directed from the generating point to the viewpoint position, is calculated. When case is positive, that is, when the target node is directed in a direction of the viewpoint, $v_m = \cos \theta$ is stored, and otherwise, $v_m = 0$ is stored. Furthermore, when $v_m$ is positive, the exaggeration distance coefficient $\varphi_m$ is multiplied by $v_m$, and adjustment may be made as $\varphi_m \leftarrow \varphi_m v_m$.

1-7 Derivation of Pseudo-Viewpoint Distance

With respect to the node of the model, for example, a pseudo-viewpoint distance $e_{zm}$ may be defined as follows.

[Equation 22]

$$e_{zm} = \varphi_m V_0 (t_m - e_0) \cdot z \quad (22)$$

1-8 Propagation of Pseudo-Viewpoint Distance

It is possible to propagate the pseudo-viewpoint distance, to prevent situations where a contradiction occurs in the distance to the pseudo-viewpoint and the size becomes distorted in the screen. For example, when the exaggeration amount of the hand and the exaggeration amount of an object held in the hand are significantly different, it appears unnatural, and therefore these exaggeration amounts can be adjusted.

With respect to the value $e_{zm}$ set in 1-7 described above, a correction value $\zeta_m$ of the pseudo-viewpoint distance is applied. Assuming that C is a combination of nodes that are in a parent-child relationship, or a combination nodes satisfying conditions that are registered as temporary connection nodes, $\zeta_m$ may be adjusted to minimize the following evaluation function $\Phi$.

[Equation 23]

$$\Phi = \sum_{(m_0, m_1) \in C} [(e_{zm0} + \zeta_{m_0}) - (e_{zm_1} + \zeta_{m_1})]^2 + \beta \sum_m \zeta_m^2 \quad (23)$$

The first term in the right side of the above equation has an effect of making the exaggeration levels of both nodes ($m_0$ and $m_1$), which have a parent-child relationship or a temporary connection relationship, to be the same level as much as possible. Furthermore, the second term on the right side has an effect of minimizing the correction amount $\zeta_m$ itself as much as possible. $\beta$ is a parameter for adjusting the intensity of both effects (ratio of both).

By using the obtained $\zeta_m$, it is possible adjust $e_{zm}$ as follows.

$$e_{zm} \leftarrow e_{zm} + \zeta_m$$

[Step 404: Arrangement of Camera]

The changed points from the other embodiments are mainly described. For example, the basic camera parameters (position $e_0$ of viewpoint, direction of camera $\theta_0$, angle of view) are set. From these information items, the viewpoint matrix $V_0$ and the projection matrix $P_0$ are created. The viewpoint matrix $V_0$ is defined as $V_0 = R_0 T_0$, by a translation matrix T in which the origin is the viewpoint position $e_0$ (p is moved in parallel to p–$e_0$), and a rotation matrix $R_0$ of rotating the sight line direction $\theta$ along the Z axis.

In the projection matrix, the matrix having the format as described above is set as follows.

[Equation 24]

$$P = \begin{bmatrix} p_{00} & 0 & 0 & 0 \\ 0 & p_{11} & 0 & 0 \\ 0 & 0 & p_{22} & p_{23} \\ 0 & 0 & 1 & 0 \end{bmatrix} \quad (24)$$

In this case, $p_{00}$, $p_{11}$ are the angle of views in the horizontal direction and the vertical direction, respectively (a reciprocal of the tangent of half). For example, in each segment m, camera parameters (position of viewpoint, camera direction, angle of view) are set. From this information, the viewpoint matrix $V_m$ and the projection matrix $P_m$ may be created.

2-1 Determination of Position of Pseudo-Viewpoint

By using the pseudo-viewpoint distance $e_{zm}$, the position of the pseudo-viewpoint is defined. For example, on a straight line connecting the pseudo-viewpoint position $e_n$ of the parent layer and the target point position $t_m$ of itself, a pseudo-viewpoint position $e_m$ is set as follows.

[Equation 25]

$$e_m = \frac{e_n \eta_e + t_m \eta_t}{\eta_e + \eta_t} \quad (25)$$

$$\eta_e = \frac{V_0 t_m \cdot z - e_{zn}}{V_0 (t_m - e_n) \cdot z}$$

$$\eta_t = \frac{e_{zn} - V_0 e_n \cdot z}{V_0 (t_m - e_n) \cdot z}$$

2-2 Determination of Zoom Correction Amount of Pseudo-Projection Matrix

The angle of view of the pseudo-projection matrix is corrected, such that in a plane $z=V_n j_m \cdot z$ (in the coordinate system of viewpoint $e_n$) including the joint point $j_m$, the scale of an image mapped by the pseudo-projection matrix of the parent node and the scale of the image mapped by the pseudo-projection matrix of this node, substantially match each other.

It is assumed that the pseudo-projection matrix $P_n$ of the parent node is already determined as follows.

[Equation 26]

$$P_n = \begin{bmatrix} p_{n00} & 0 & p_{n02} & 0 \\ 0 & p_{n11} & p_{n12} & 0 \\ 0 & 0 & p_{n22} & p_{n23} \\ 0 & 0 & 1 & 0 \end{bmatrix} \quad (26)$$

Based on the above, the projection matrix $P_m$ of the node m is obtained. The components of $P_m$ are as follows.

[Equation 27]

$$P_m = \begin{bmatrix} p_{m00} & 0 & p_{m02} & 0 \\ 0 & p_{m11} & p_{m12} & 0 \\ 0 & 0 & p_{m22} & p_{m23} \\ 0 & 0 & 1 & 0 \end{bmatrix} \quad (27)$$

First, a pseudo-projection matrix $P'_m$ in which only the angle of view is corrected, is created as follows.

[Equation 28]

$$P'_m = \begin{bmatrix} p_{n00} \frac{V_m j_m \cdot z}{V_n j_m \cdot z} & 0 & 0 & 0 \\ 0 & p_{n11} \frac{V_m j_m \cdot z}{V_n j_m \cdot z} & 0 & 0 \\ 0 & 0 & p_{n22} & p_{n23} \\ 0 & 0 & 1 & 0 \end{bmatrix} \quad (28)$$

2-3 Determination of Oblique Correction Amount of the Pseudo-Projection Matrix

The oblique correction amount of the pseudo-projection matrix is corrected, and the shift amount is set such that in a plane $z=V_n j_m \cdot z$ (in the coordinate system of viewpoint $e_n$) including the joint point $j_m$, the image mapped by the pseudo-projection matrix of the parent node, and the image mapped by the pseudo-projection matrix of this node, substantially match each other.

With respect to the pseudo-projection matrix $P'_m$ before setting the shift amount, the (0,2) and (1,2) components are corrected as follows, and this is determined as $P_m$.

[Equation 29]

$$P_{m02} = \frac{P_n V_n j_m \cdot x}{P_n V_n j_m \cdot w} - \frac{P'_m V_m j_m \cdot x}{P'_m V_m j_m \cdot w} \quad (29)$$

$$P_{m12} = \frac{P_n V_n j_m \cdot y}{P_n V_n j_m \cdot w} - \frac{P'_m V_m j_m \cdot y}{P'_m V_m j_m \cdot w}$$

According to the procedures from 2-1 through 2-3 described above, it is possible to sequentially arrange pseudo-cameras, starting from the parent node in a top-down manner.

[Step 406: Transformation of Vertex]

A node m corresponding to each vertex of a model (the position coordinate in the basic pose is $p^0$) is searched for, and the pseudo-viewpoint matrix and the pseudo-projection matrix of the node may be used to calculate the position in the view volume in the exaggerated expression by the following equation.

$$[x, y, z, w]^T = P_m V_m M_m p^0$$

The vertex is finally mapped on a point (x/w, y/w) in the two-dimensional image. Furthermore, the regular viewpoint matrix of the basic camera and a projection matrix are used, to calculate the value $$[x_0, y_0, z_0, w_0]^T = PVM_m p^0$$

of the position in a regular view volume (coordinate value obtained by projection transformation by using a basic camera), and $z_0/w_0$ is set as the perspective depth value.

[Step 408: Filling Pixels]

The pixels in the two-dimensional image are filled (a rasterizing process is performed). In this filling in process, the color of the triangle in the front finally needs to be visible, and therefore the drawing order is important. In order to follow this depth order, the depth value $z_0/w_0$ obtained by transformation of the vertex is used to sort the surfaces, and the furthest surface is drawn first, and closer surfaces are drawn by overwriting the drawn surfaces.

[Combination with Animation]

When the smoothing process with respect to the animation as described in the third embodiment is applied, in the evaluation function $\Phi$ of "Process 1-8 Propagation of pseudo-viewpoint distance", the following may be added as a term expressing variations in the frame,

[Equation 30]

$$\sum_f [\zeta_m(f) - \zeta_m(f+1)]^2 \quad (30)$$

and the following change may be made, to perform the optimization process.

[Equation 31]

$$\Phi = \sum_f \left\{ \sum_{(m_0, m_1) \in C} [(e_{zm_0}(f) + \zeta_{m_0}(f)) - (e_{zm_1}(f) + \zeta_{m_1}(f))]^2 + \sum_m \zeta_m(f)^2 + \sum_m [\zeta_m(f) - \zeta_m(f+1)]^2 \right\} \quad (31)$$

Sixth Embodiment

[Picking Process]

A picking process is a process of recognizing which object has been pointed to, in a case where some of the three-dimensional objects displayed on a screen has been pointed at by a pointing device or a finger.

In the embodiments described above, the three-dimensional object is rendered into a two-dimensional object by a plurality of cameras, and therefore it is necessary to handle a picking process. Implementation examples for realizing a picking process are as follows.

(a) Select a bone or a joint, and change the pose of the object.
(b) Select a mesh, and adjust the detailed parts of an object.

In the case of the above (a), there is a limit to the number of bones and joints in an actual object, and therefore position information of the bones and joints may be stored in a storage unit. Then, when a point in the screen is pointed at, it may be determined that a bone or joint nearest to the point has been selected.

In the case of the above (b), for example, a buffer area for storing a two-dimensional position in the image is applied to each vertex of a polygon. By storing information of the two-dimensional position in a buffer at the time of rendering, the recognition in the picking process may be performed.

Figure 20:
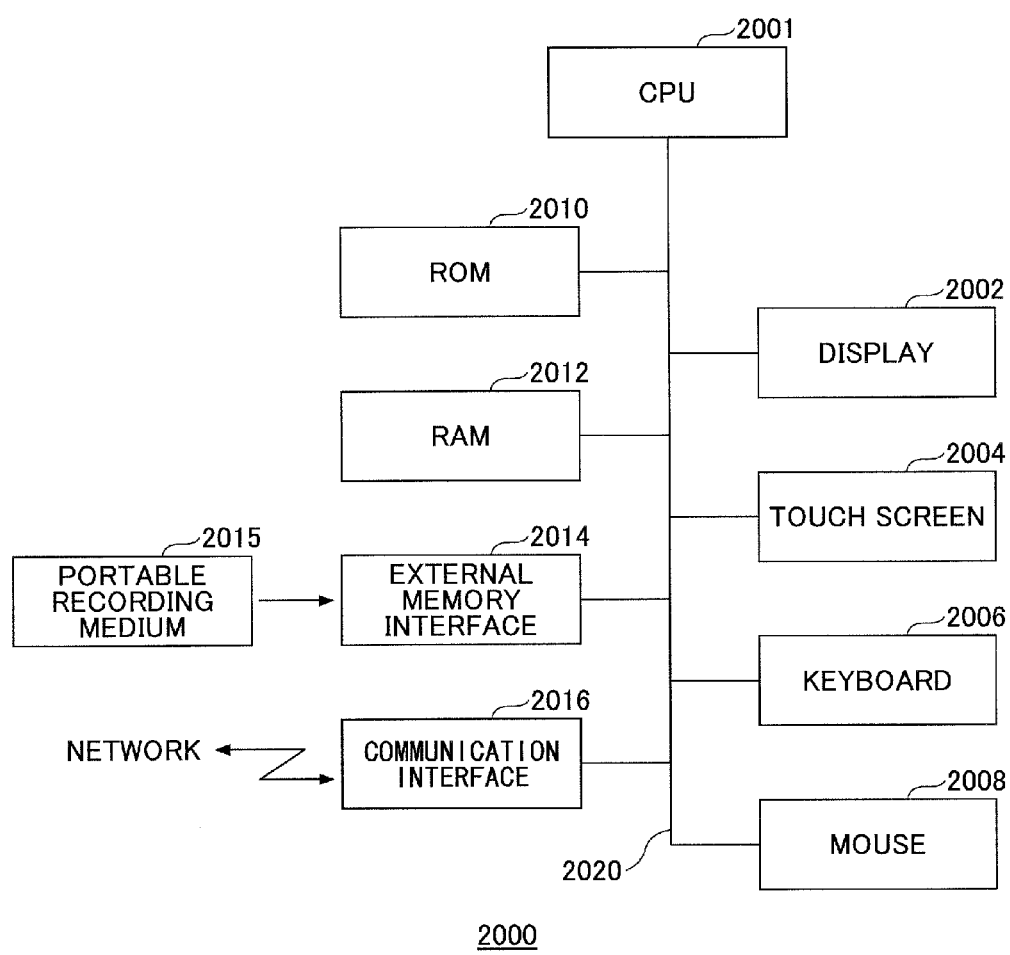
FIG. 20 illustrates a hardware configuration example of a system for implementing the embodiments described in the present specification.

FIG. 20 illustrates a hardware configuration example of a system 2000 for implementing the embodiments described in the present specification. The system 2000 includes a CPU 2001, a display 2002, a touch screen 2004, a keyboard 2006, a mouse 2008, a ROM 2010, a RAM 2012, an external memory interface 2014 for reading and writing in a portable recording medium 2015, a communication interface 2016 for communicating with the network, and a bus 2020 for connecting the hardware elements. Note that the input output devices such as the display 2002, the touch screen 2004, the keyboard 2006, and the mouse 2008 are examples, and not all of these elements need to be included. Furthermore, other input output devices may obviously be used.

Note that all of or part of the present embodiment is implemented by a program. This program may be stored in the portable recording medium 2015. The portable recording medium 2015 is one or more non-transitory recording media. Examples of the portable recording medium 2015 are a magnetic recording medium, an optical disk, a magneto optical recording medium, and a non-volatile memory. The magneto optical recording medium may be a HDD, a flexible disk (FD), and a magnetic tape (MT). The optical disk may be a DVD (Digital Versatile Disc), a DVD-RAM, a CD-ROM (Compact Disc-Read Only Memory), and a CD-R (Recordable)/RW (ReWritable). Furthermore, the magneto optical recording medium may be a magneto optic disc (MO). As the program stored in the portable recording medium is read and executed by a processor, all of or part of the embodiments of the present invention may be implemented.

Note that the embodiments described in the present specification are for understanding the present invention, and do not limit the scope of the present invention. Furthermore, the plurality of contents described in the embodiments are not exclusive with each other. Therefore, unless a contradiction occurs, the elements described in different portions may be combined. Furthermore, in the present invention according to the method and program described in the claims, the order of performing the processes may be replaced, unless a contradiction occurs. Alternatively, a plurality of processes may be executed at the same time. These embodiments are included in the technical scope of the present invention described in the claims.

Furthermore, as a computer executes a program code that has been read, not only are the functions of the above embodiments realized, but based on the instruction of the program code, the programs such as the OS operating the computer, a virtual machine monitor VMM, firmware, and BIOS perform part of or all of the actual processes, and the functions of the embodiments realized by these processes are also included in the present invention.

Furthermore, the configuration elements in the embodiments of the present invention may be realized by a plurality of hardware elements that are physically separated. Furthermore, the configuration elements in the embodiments of the present invention may be realized by operating in one or more servers. Furthermore, there may be a plurality of CPUs for executing the programs according to the embodiments of the present invention, and each of the CPUs may include a plurality of cores.

Furthermore, the present invention may be implemented in other devices provided with at least a CPU and a memory, such as a general-purpose computer, a laptop computer, a hand-held computer, a mobile phone, a TV, and a game console.

According to an aspect of the embodiments, an exaggerated image can be simply drawn from a 3D model.

Regarding the above embodiments, the following notes are disclosed.

(Note 1)

A drawing apparatus for drawing a three-dimensional model including a plurality of nodes present in a three-dimensional space, by using a plurality of viewpoints, the drawing apparatus comprising:

a memory configured to store drawing information including a correspondence relationship between the plurality of nodes and the plurality of viewpoints, an influence rate applied by each of the plurality of nodes to drawing positions of vertices of a plurality of polygons constituting the three-dimensional model, and drawing parameters relevant to the plurality of viewpoints; and a CPU configured to transform the three-dimensional model into an image, by the plurality of polygons, by using the drawing information, wherein the CPU changes the drawing information in response to a predetermined event, and calculates the drawing positions of the vertices of the plurality of polygons, by using the viewpoints corresponding to the nodes to which the vertices belong, based on the changed drawing information.

(Note 2)

The drawing apparatus according to note 1, wherein when the predetermined event is an event of receiving a selection of a template model from an operator, the CPU performs the process of changing the drawing information by associating the plurality of nodes of the three-dimensional model with a plurality of nodes of the template mode, and storing drawing information of the template model as drawing information of the three-dimensional model, in the memory.

(Note 3)

The drawing apparatus according to note 1 or 2, wherein when the predetermined event is an event of receiving a selection of a plurality of template models from an operator, the CPU performs the process of changing the drawing information by
selecting a template model that is most similar to the three-dimensional model from among the plurality of template models, based on pattern recognition, and
storing drawing information of the selected template model as drawing information of the three-dimensional model, in the memory.

(Note 4)
The drawing apparatus according to any one of notes 1 through 3, wherein
when the predetermined event is an event that a predetermined node is present in a range of predetermined positions,
the CPU performs the process of changing the drawing information by
changing a predetermined item of the drawing information into a predetermined value.

(Note 5)
The drawing apparatus according to any one of notes 1 through 4, wherein
when the predetermined event is an event of recognizing that a predetermined one or more of the nodes form a predetermined shape,
the CPU performs the process of changing the drawing information by
changing a predetermined item of the drawing information into a predetermined value.

(Note 6)
The drawing apparatus according to any one of notes 1 through 5, wherein
when the predetermined event is an event of recognizing that collision has occurred among the plurality of nodes,
the CPU performs the process of changing the drawing information by
changing a predetermined item of the drawing information into a predetermined value.

(Note 7)
A drawing method of drawing a three-dimensional model including a plurality of nodes present in a three-dimensional space, by using a plurality of viewpoints,
the drawing method being executed by a CPU by using drawing information stored in a memory, the drawing information including a correspondence relationship between the plurality of nodes and the plurality of viewpoints, an influence rate applied by each of the plurality of nodes to drawing positions of vertices of a plurality of polygons constituting the three-dimensional model, and drawing parameters relevant to the plurality of viewpoints, the drawing method comprising:
changing the drawing information in response to a predetermined event, and
calculating the drawing positions of the vertices of the plurality of polygons, by using the viewpoints corresponding to the nodes to which the vertices belong, based on the changed drawing information.

(Note 8)
The drawing method according to node 7, wherein
when the predetermined event is an event of receiving a selection of a template model from an operator,
the changing of the drawing information is performed by
associating the plurality of nodes of the three-dimensional model with a plurality of nodes of the template mode, and
storing drawing information of the template model as drawing information of the three-dimensional model, in the memory.

(Note 9)
The drawing method according to node 7 or 8, wherein
when the predetermined event is an event of receiving a selection of a plurality of template models from an operator,
the changing of the drawing information is performed by
selecting a template model that is most similar to the three-dimensional model from among the plurality of template models, based on pattern recognition, and
storing drawing information of the selected template model as drawing information of the three-dimensional model, in the memory.

(Note 10)
The drawing method according to any one of nodes 7 through 9, wherein
when the predetermined event is an event that a predetermined node is present in a range of predetermined positions,
the changing of the drawing information is performed by
changing a predetermined item of the drawing information into a predetermined value.

(Note 11)
The drawing method according to any one of nodes 7 through 10, wherein
when the predetermined event is an event of recognizing that a predetermined one or more of the nodes form a predetermined shape,
the changing of the drawing information is performed by
changing a predetermined item of the drawing information into a predetermined value.

(Note 12)
The drawing method according to any one of nodes 7 through 11, wherein
when the predetermined event is an event of recognizing that collision has occurred among the plurality of nodes,
the changing of the drawing information is performed by
changing a predetermined item of the drawing information into a predetermined value.

(Note 13)
A non-transitory computer-readable recording medium storing a program that causes a computer to execute the drawing method according to any one of nodes 7 through 12.

What is claimed is:
1. A drawing apparatus for drawing a three-dimensional model including a plurality of nodes present in a three-dimensional space, by using different perspective projections based on a plurality of camera viewpoints, the drawing apparatus comprising:
a memory configured to store drawing information including a correspondence relationship between the plurality of nodes and the plurality of camera viewpoints, and drawing parameters relevant to the plurality of camera viewpoints; and
a CPU configured to transform the three-dimensional model into an image, by a plurality of polygons constituting the three-dimensional model, by using the drawing information, wherein
the CPU
changes the drawing information in response to a position or a state of a predetermined one or a plurality of the nodes satisfying a predetermined condition, and
calculates drawing positions of vertices of the plurality of polygons, by using the camera viewpoints corresponding to the nodes to which the vertices belong, based on the changed drawing information, wherein
in at least one combination of a first camera viewpoint from among the plurality of camera viewpoints, a second camera viewpoint from among the plurality of camera viewpoints, and a node from among the plurality of nodes, a position of the node in a first image, in which the node is drawn using the first camera viewpoint and a drawing parameter corresponding to the first camera viewpoint, is the same as the position of the node in a second image, in which the node is drawn using the second camera viewpoint and a drawing parameter corresponding to the second camera viewpoint.

2. The drawing apparatus according to claim 1, wherein
the predetermined condition is that the predetermined one or a plurality of the nodes is present at a position within a predetermined range.

3. The drawing apparatus according to claim 1, wherein
the predetermined condition is that the predetermined one or a plurality of the nodes is directed in a predetermined direction or is forming a predetermined pose.

4. The drawing apparatus according to claim 1, wherein
the predetermined condition is that images of the predetermined plurality of the nodes are overlapping each other.

5. The drawing apparatus according to claim 4, wherein
when the overlapping is determined to be occurring in a particular frame among a plurality of frames constituting an animation, a correction value that is smoothed is applied to the plurality of frames constituting the animation, by applying a difference value expressing a difference between the drawing information before correction and the drawing information after correction, to a predetermined number of the frames that come before and/or after the particular frame in terms of time, and applying a value that is interpolated according to positions of the frames, to each of a predetermined number of the frames counted from the particular frame.

6. The drawing apparatus according to claim 1, wherein
the position of at least one of the plurality of viewpoints is moved forward from the viewpoint position of a parent layer.

7. The drawing apparatus according to claim 1, wherein
the position of at least one of the plurality of viewpoints is set based on a line connecting a target point and a viewpoint position of a parent layer of a viewpoint tree, and
a ratio between a length to the target point and a length to the viewpoint position of the parent layer is set as a coefficient by which a feature positioned at the target node is exaggerated.

8. The drawing apparatus according to claim 7, wherein
the position of at least one of the plurality of viewpoints is defined by the equation:

$$e_m = (e_n + \eta_m t_m)/(1 + \eta_m).$$

9. A drawing method of drawing a three-dimensional model including a plurality of nodes present in a three-dimensional space, by using different perspective projections based on a plurality of camera viewpoints, the drawing method being executed by a CPU by using drawing information stored in a memory, the drawing information including a correspondence relationship between the plurality of nodes and the plurality of camera viewpoints, and drawing parameters relevant to the plurality of camera viewpoints, the drawing method comprising:

changing the drawing information in response to a position or a state of a predetermined one or a plurality of the nodes satisfying a predetermined condition; and calculating drawing positions of vertices of a plurality of polygons constituting the three-dimensional model, by using the camera viewpoints corresponding to the nodes to which the vertices belong, based on the drawing information including changed drawing information, wherein in at least one combination of a first camera viewpoint from among the plurality of camera viewpoints, a second camera viewpoint from among the plurality of camera viewpoints, and a node from among the plurality of nodes, a position of the node in a first image, in which the node is drawn using the first camera viewpoint and a drawing parameter corresponding to the first camera viewpoint, is the same as the position of the node in a second image, in which the node is drawn using the second camera viewpoint and a drawing parameter corresponding to the second camera viewpoint.

10. The drawing method according to claim 9, wherein
the predetermined condition is that the predetermined one or a plurality of the nodes is present at a position within a predetermined range.

11. The drawing method according to claim 9, wherein
the predetermined condition is that the predetermined one or a plurality of the nodes is directed in a predetermined direction or is forming a predetermined pose.

12. The drawing method according to claim 9, wherein
the predetermined condition is that images of the predetermined plurality of the nodes are overlapping each other.

13. The drawing method according to claim 12, further comprising:
applying a correction value that is smoothed to a plurality of frames constituting an animation, when the overlapping is determined to be occurring in a particular frame among the plurality of frames constituting the animation, the correction value being applied by applying a difference value expressing a difference between the drawing information before correction and the drawing information after correction, to a predetermined number of the frames that come before and/or after the particular frame in terms of time, and applying a value that is interpolated according to positions of the frames, to each of a predetermined number of the frames counted from the particular frame.

14. A drawing method of drawing a three-dimensional model including a plurality of nodes present in a three-dimensional space, by using different perspective projections based on a plurality of camera viewpoints, the drawing method being executed by a CPU by using drawing information stored in a memory, the drawing information including a correspondence relationship between the plurality of nodes and the plurality of camera viewpoints, and drawing parameters relevant to the plurality of camera viewpoints, the drawing method comprising:

acquiring a correspondence of regions from a plurality of regions of a standard model for which drawing information is defined and a plurality of regions of the three-dimensional model for which drawing information is not defined;

applying the drawing information of the standard model to the three-dimensional model based on the correspondence of regions;

storing the applied drawing information in the memory; and calculating drawing positions of vertices of a plurality of polygons constituting the three-dimensional model, by using the camera viewpoints corresponding to the nodes to which the vertices belong, based on the drawing information stored in the memory, wherein in at least one combination of a first camera viewpoint from among the plurality of camera viewpoints, a second camera viewpoint from among the plurality of camera viewpoints, and a node from among the plurality of nodes, a position of the node in a first image, in which the node is drawn using the first camera viewpoint and a drawing parameter corresponding to the first camera viewpoint, is the same as the position of the node in a second image, in which the node is drawn using the second camera viewpoint and a drawing parameter corresponding to the second camera viewpoint.

15. The drawing method according to claim 14, further comprising:

setting, as the standard model, a model that is most similar to the three-dimensional model from among a plurality of models for which drawing information is defined, based on pattern recognition.

16. A non-transitory computer-readable recording medium storing a program that causes a computer to execute the drawing method according to claim 9.

17. A non-transitory computer-readable recording medium storing a program that causes a computer to execute the drawing method according to claim 14.

* * * * *